(12) United States Patent
Shirota et al.

(10) Patent No.: US 11,104,255 B2
(45) Date of Patent: Aug. 31, 2021

(54) STRUCTURE FOR OPERATIONAL PORTION IN VEHICLE

(71) Applicants: TOYOTA JIDOSHA KYUSHU KABUSHIKI KAISHA, Miyawaka (JP); TOYOTA JIDOSHA KABUSHIKI KAISHA, Toyota (JP)

(72) Inventors: Shohei Shirota, Miyawaka (JP); Yoichi Urabe, Miyawaka (JP); Shinya Kimura, Toyota (JP)

(73) Assignees: TOYOTA JIDOSHA KYUSHU KABUSHIKI KAISHA, Miyawaka (JP); TOYOTA JIDOSHA KABUSHIKI KAISHA, Toyota (JP)

(*) Notice: Subject to any disclaimer, the term of this patent is extended or adjusted under 35 U.S.C. 154(b) by 268 days.

(21) Appl. No.: 15/835,118

(22) Filed: Dec. 7, 2017

(65) Prior Publication Data

US 2018/0170227 A1 Jun. 21, 2018

(30) Foreign Application Priority Data

Dec. 20, 2016 (JP) .............................. JP2016-246676

(51) Int. Cl.
*B60N 2/75* (2018.01)
*B60K 35/00* (2006.01)
(Continued)

(52) U.S. Cl.
CPC .............. *B60N 2/797* (2018.02); *B60K 35/00* (2013.01); *B60K 37/00* (2013.01); *G06F 3/02* (2013.01);
(Continued)

(58) Field of Classification Search
CPC ........ B60N 2/797; B60K 37/06; B60K 35/00; G06F 3/0362; G06F 3/0488
See application file for complete search history.

(56) References Cited

U.S. PATENT DOCUMENTS 5,956,019 A * 9/1999 Bang ................... G06F 3/03547
345/157
6,025,831 A 2/2000 Gardiner
(Continued)

FOREIGN PATENT DOCUMENTS

EP 1695860 A2 * 8/2006
FR 2990778 * 11/2013
(Continued)

OTHER PUBLICATIONS

Stack / Definition of Stack at Dictionary.com., Aug. 26, 2020 (Year: 2020).*

(Continued)

*Primary Examiner* — Vinh Luong
(74) *Attorney, Agent, or Firm* — Oliff PLC

(57) ABSTRACT

A structure 1 for an operational portion in a vehicle provided at a side of a driver seat in a vehicle, comprising: a touch pad 14 having a contacted operational surface 14a receiving contact as an input operation; a rest surface formation portion 15 including a palm rest portion 21 provided behind the touch pad 14 and used for operation of the touch pad 14 and an arm rest portion 22 forming a rest surface 15a continuous to the palm rest portion 21; and an audio switch 16 provided between the touch pad 14 and the arm rest portion 22 in a front and back direction of the vehicle, the audio switch 16 operating an audio device equipped in the vehicle.

14 Claims, 14 Drawing Sheets

(51) Int. Cl.
*G06F 3/0354* (2013.01)
*B60K 37/00* (2006.01)
*G06F 3/0362* (2013.01)
*G06F 3/02* (2006.01)

(52) U.S. Cl.
CPC ........ *G06F 3/0362* (2013.01); *G06F 3/03547* (2013.01); *B60K 2370/143* (2019.05); *B60K 2370/145* (2019.05); *B60K 2370/1438* (2019.05); *B60K 2370/1446* (2019.05); *B60K 2370/654* (2019.05)

(56) References Cited

U.S. PATENT DOCUMENTS

| | | | | |
|---|---|---|---|---|
| D442,958 | S | * | 5/2001 | Funakoshi ................ D14/402 |
| 6,903,720 | B1 | | 6/2005 | Glithero |
| 7,302,322 | B1 | * | 11/2007 | Szczerba ............ B60R 16/0231 |
| | | | | 701/29.6 |
| 8,319,832 | B2 | | 11/2012 | Nagata et al. |
| 10,095,313 | B2 | * | 10/2018 | Lee ....................... G06F 3/0362 |
| 2007/0176448 | A1 | | 8/2007 | Spykerman et al. |
| 2007/0273207 | A1 | * | 11/2007 | Dorn ...................... B60K 37/06 |
| | | | | 307/10.1 |
| 2008/0129071 | A1 | * | 6/2008 | Hipshier .................. B60R 7/04 |
| | | | | 296/37.8 |
| 2009/0195659 | A1 | * | 8/2009 | Nagata ................ G06F 3/03547 |
| | | | | 348/207.1 |
| 2010/0090491 | A1 | * | 4/2010 | Hipshier .................. B60R 7/04 |
| | | | | 296/24.34 |
| 2014/0191558 | A1 | * | 7/2014 | Riedel, Jr. .............. B60K 20/08 |
| | | | | 298/19 R |
| 2017/0001521 | A1 | * | 1/2017 | Joo ........................ B60N 2/002 |
| 2017/0024023 | A1 | * | 1/2017 | Suzuki .................. G06F 3/0354 |
| 2018/0201165 | A1 | * | 7/2018 | Rekow ................. B60N 2/5664 |
| 2019/0210458 | A1 | * | 7/2019 | Harris ................... F16H 59/044 |
| 2019/0322176 | A1 | * | 10/2019 | Tanaka .................. G06F 3/0488 |

FOREIGN PATENT DOCUMENTS

| | | | |
|---|---|---|---|
| JP | 2000-235453 A | | 8/2000 |
| JP | 2006029917 A | * | 2/2006 |
| JP | 2010-036731 A | | 2/2010 |
| JP | 2011-243418 A | | 12/2011 |
| JP | 2013-098133 A | | 5/2013 |
| JP | 2013-169927 A | | 9/2013 |
| JP | 2015-189413 A | | 11/2015 |
| JP | 2015-202698 A | | 11/2015 |

OTHER PUBLICATIONS

Define stacked on—Google Search, Aug. 26, 2020 (Year: 2020).*
Define tapered Google Search, Jan. 13, 2021 (Year: 2021).*
Define slanted Google Search, Jan. 13, 2021 (Year: 2021).*
Derwent Abstract of FR 2990778, Pognon, Nov. 22, 2013 (Year: 2013).*
Define edge Google Search, Jan. 13, 2021 (Year: 2021).*
Feb. 1, 2018 Extended Search Report issued in European Patent Application No. 17196745.8.

* cited by examiner

STRUCTURE FOR OPERATIONAL PORTION IN VEHICLE

BACKGROUND OF THE INVENTION

1. Field of the Invention

The present invention relates to a structure for an operational portion in a vehicle to operate in-vehicle equipment.

2. Description of Related Art

In a vehicle such as cars and the like, an operational portion to operate in-vehicle equipment such as an audio device or a navigation device, etc. is provided at a lateral side of a driving seat in a vehicle room. This type of operational portion in a vehicle is generally arranged between the driving seat and a passenger seat, for example, on an upper surface of a center console, so that a person sitting on the driving seat or the passenger seat can operate without badly losing posture.

Recently, for this type of operational portion in a vehicle, it is proposed a structure including a touch operational portion called as a touch-pad and the like having a contacted operational planar surface on which contact of finger tips of an operator is received as operational input (for example, see Japanese Patent Laid-open Publication No. 2015-202698). Concerning the touch operational portion, as described in Japanese Patent Laid-open Publication No. 2015-202698, a palm rest for putting a palm of the operator is arranged behind the touch operational portion while considering to obtain good operability. Here, the touch operational portion is utilized to operate on a screen display, for example, such as cursor movement on an operation screen displayed on a display device provided in an instrument panel in the vehicle room.

SUMMARY OF THE INVENTION

1. Problems to be Solved by Invention

In the operational portion in a vehicle described in the above, it is provided an audio operational portion to operate an audio device including such as a CD/DVD player or AM/FM tuner and the like and playing back music or video. In the audio operational portion, operation mutually concerning both the audio operational portion and the touch operational portion is often conducted as an operation portion of multi-media system in cooperation with the touch operational portion. Therefore, it will be desirable that both the touch operational portion and the audio operational portion are mutually arranged in close proximity so that, for example, movement amount of a hand becomes less between both operational portions while considering to obtain good operability.

On the other hand, as for the operational portions in a vehicle provided between the driving seat and the passenger seat, for example, a width of the center console becomes narrow in the car having a comparatively narrow car width, thus restrictions on a space exist and it is necessary to avoid interference with the other portion such as cup holder and the like provided on the center console. Therefore, there will be a difficult case to arrange the audio operational portion near the touch operational portion. Especially, as mentioned, since the palm rest exists behind the pad operational portion, it is difficult to arrange the audio operational portion near and behind the pad operational portion.

Further, as for the touch operational portion, since a hand position is determined by the palm rest arranged behind the touch operational portion, an operation without directly seeing the operational portion, that is, a blind operation can be relatively easily done. On the contrary, as for the audio operational portion, since the hand position is not determined, the blind operation is difficult. Therefore, there will be a difficult case to operate the audio operational portion by a driver driving a vehicle. Considering this point, although it is conceivable a structure that a palm rest dedicated for the audio operational portion is provided, restrictions on space mentioned in the above exist in this structure and it is necessary to distinguish with the palm rest of the touch operational portion, therefore such structure has poor possibility.

The present invention has been made in taking above problems into consideration and has an object to provide a structure for an operational portion in a vehicle through which space efficiency can be improved and operability of each operational portion including blind operation can be improved in a structure having a touch operational portion and an audio operational portion.

2. Means to Solve Problems

According to one aspect of the present invention, it is provided a structure for an operational portion in a vehicle provided at a side of a driver seat in a vehicle, comprising:

a touch operational portion having a contacted operational surface receiving contact as an input operation;

a rest surface formation portion including a palm rest portion provided behind the touch operational portion and used for operation of the touch operational portion and an arm rest portion forming a rest surface continuous to the palm rest portion; and an audio operational portion provided between the touch operational portion and the arm rest portion in a front and back direction of the vehicle, the audio operational portion operating an audio device equipped in the vehicle.

3. Effects of Invention

According to the present invention, in the constitution having the touch operational portion and the audio operational portion, space efficiency can be improved and blind operability can be improved.

BRIEF DESCRIPTION OF THE DRAWINGS

FIG. 7A shows one corresponding relation between rotational operation directions and functions thereof and FIG. 7B shows another corresponding relation opposite to one corresponding relation between the rotational operation directions and the functions thereof.

FIG. 9A shows a case that a palm of an operator positions on a rear side of a front rigid portion and FIG. 9B shows a case that the palm of the operator positions on a rear side of a rear rigid portion

FIG. 11A shows a case that the palm of the operator positions on a rear side of a front uneven portion for guide and FIG. 11B shows a case that the palm of the operator positions on a rear side of a rear uneven portion.

FIG. 12A shows a case that a formation pitch of protrusions in an uneven portion for guide and a formation pitch of protrusions in a normal uneven portion is made different and FIG. 12B shows a case that height of each protrusion in the uneven portion for guide is larger than height of each protrusion in the normal uneven portion, in addition to that the formation pitch of protrusions in the uneven portion for guide and the formation pitch of protrusions in the normal uneven portion is made different.

FIG. 13A shows a case that the palm of the operator is put on a front recess and FIG. 13B shows a case that the palm of the operator is put on a rear recess.

FIG. 14A is a side view showing a state that a thumb of the operator is fit in a recess for thumb and FIG. 14B is a plan view showing a state that the thumb of the operator is fit in the recess for thumb.

DETAILED DESCRIPTION

A structure for an operational portion (hereinafter, abbreviated as "operational portion structure") in a vehicle according to the present invention possesses a structure in which a palm rest for a touch operational portion and an arm rest functioning as an elbow place for an occupant of a vehicle are integrally and continuously formed in a structure having a touch operational portion and an audio operational portion and further this structure and the audio operational portion are integrally provided. Thereby, the operational portion structure in a vehicle possesses the audio operational portion provided behind the touch operational portion. According to this structure, the present invention intends to improve space efficiency at the lateral side of the driver seat and to improve operability of each operational portion, especially blind operability. Hereinafter, an embodiment of the present invention will be described.

Figure 1:
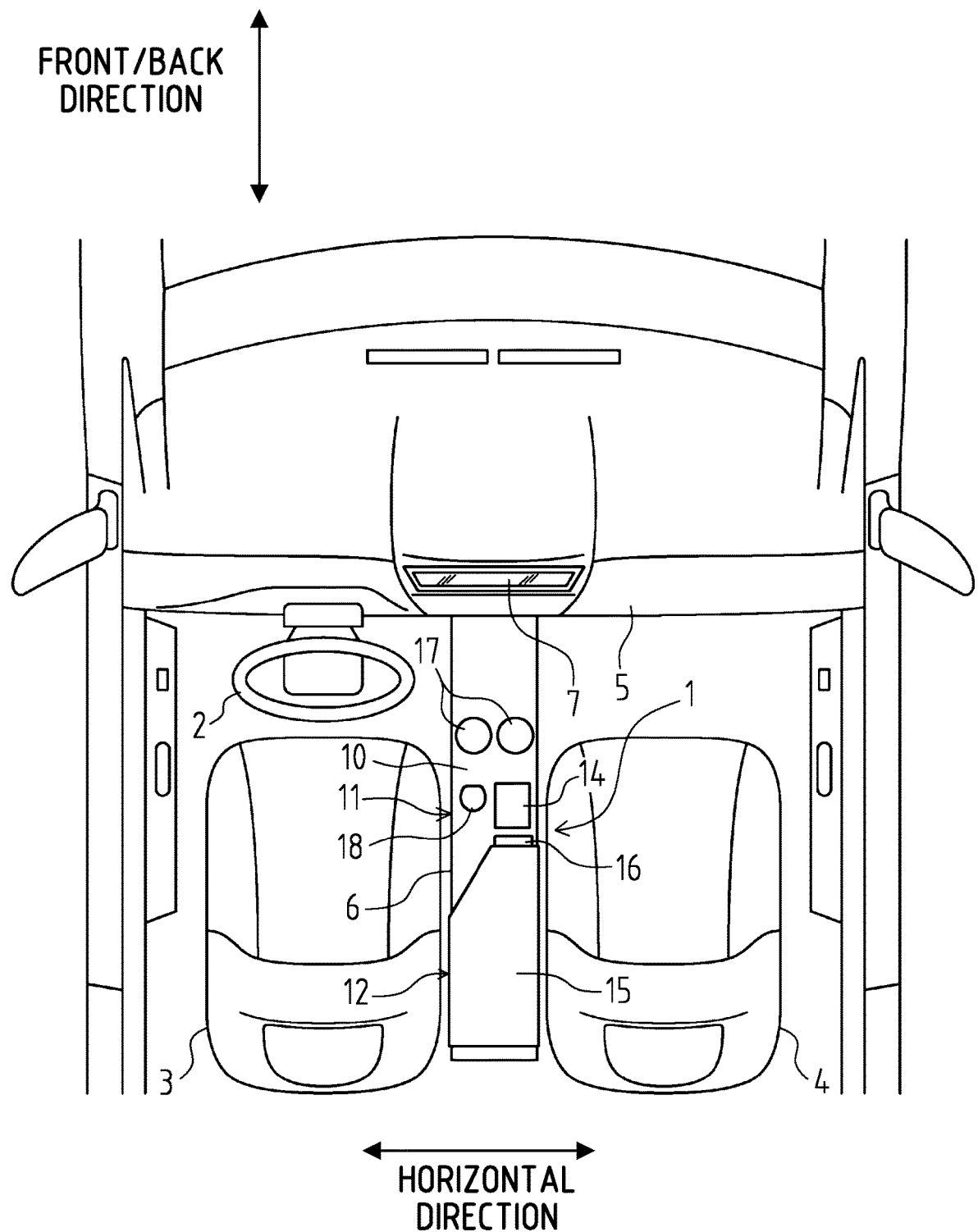
FIG. 1 is a plan view showing a constitution of a vehicle room of a car according to one embodiment of the present invention.
Figure 2:
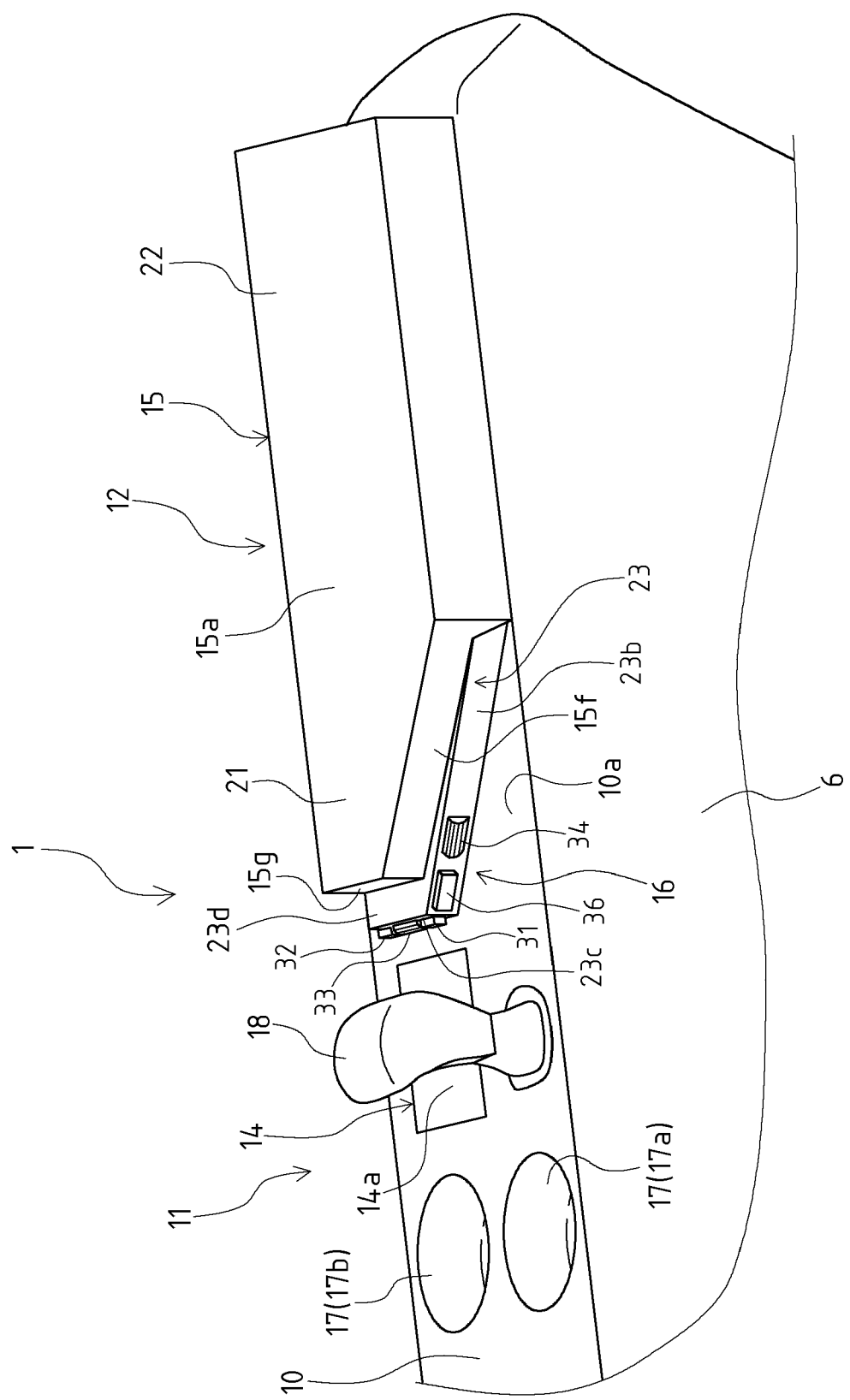
FIG. 2 is a perspective view showing a structure for an operational portion in a vehicle according to one embodiment of the present invention.

As shown in FIG. 1, an operational portion structure 1 of an operational operation portion in a vehicle according to the present embodiment is arranged at a side direction (right side direction) of a driver seat 3 positioning behind a steering wheel 2. At the right side of the driver seat 3, a passenger seat 4 is arranged. A car according to the present embodiment is a car of left handle in which the steering wheel 2 is provided at the left side and the operational portion structure 1 is provided at the lateral side of the passenger seat 4 for the driver seat 3 (right side in FIG. 1, abbreviated as "passenger seat side" hereinafter).

In the vehicle room, in front of the driver seat 3 and the passenger seat 4, it is provided an instrument panel 5 extending in a vehicle width direction (right and left direction, right and left direction in FIG. 1). A center console 6 is extended in a rear direction so as to continue to the instrument panel 5 from a center portion in the vehicle width direction of the instrument panel 5. The center console 6 is provided so as to extend in a front and back direction of the vehicle (up and down direction in FIG. 1) between the driver seat 3 and the passenger seat 4. The operational portion structure 1 is provided on the center console 6.

A display 7 is arranged to the center portion in the vehicle width direction of the instrument panel 5. The display 7 is, for example, a liquid-crystal color display device and displays information or images concerning in-vehicle equipment such as audio device or navigation device and the like for the occupant of the car. The audio device is a device to play back music or video and includes a CD/DVD player or an AM/FM tuner and the like. The navigation device is a device to provide road map information and to conduct route guide to destination. Further, in the vehicle room, there is provided another in-vehicle equipment device such as speakers to reproduce playback sounds of the audio device and guide sounds of the navigation device and the like.

Hereinafter, the operational portion structure 1 according to the present embodiment will be described. As shown in FIGS. 1 to 4, the operational portion structure 1 (also referred to as a "control interface") is provided on an upper surface portion of the center console 6 extending in the front and back direction of vehicle. The operational portion structure 1 roughly possesses a an operational portion arrangement portion 11 having a base surface 10 (also referred to as a "base portion") like a horizontal plane becoming a standard surface on which various operational portions and the like are arranged and a raised portion 12 which is formed at a rear side of the operational portion arrangement portion 11 and is raided against the base surface 10. The rear portion of the operational portion arrangement portion 11 and the front portion of the raised portion 12 are mutually overlapped.

It will be hereinafter described each constitution provided in the operational portion structure 1 including layouts of various constitutions provided on the center console 6. The operational portion structure 1 possesses a touch pad 14 as a touch operational portion, a rest surface formation portion 15 (also referred to as a "rest portion") formed behind the touch pad 14, an audio switch 16 as an audio operational portion integrally formed with a front portion of the rest surface formation portion 15 at a rear position of touch pad 14. Further, in the operational portion arrangement portion 11, cup holders 17 and a shift lever 18 are arranged.

The cup holders 17 are formed at a front portion of the operation portion arrangement portion 11. Two of the cup holders 17 are arranged side by side. The cup holders 17 are recess portions opened in substantially circular shape against the base surface 10.

The shift lever 18 is an operational portion to operate a transmission provided in a car. The shift lever 18 is arranged at a portion of the driver seat side in an intermediate position in the front and back direction on the operational portion arrangement portion 11. Namely, the shift lever 18 is arranged behind the cup holder 17a of the driver seat side.

The shift lever 18 is protruded upward from the base surface 10 with a substantially vertical state against the base surface 10. The shift lever 18 is provided so that the shift lever 18 can be moved and operated in predetermined directions including the front and back direction and positions of the shift driver 18 can be exchanged step by step.

The touch pad 14 is utilized, for example, for operation on the screen display such as movement of cursor and the like on the operation screen displayed on the display 7 provided in the instrument panel 5 in the vehicle room. The touch pad 14 has a contacted operational surface 14a receiving contact as operation input.

The touch pad 14 has a rectangular outline shape in a planer view and a pair of sides (right and left sides) mutually opposing in such outline shape are provided so that both sides are arranged substantially along the front and back direction. In the touch pad 14, the contacted operational surface 14a is formed in a planar surface having a rectangular outline shape. The touch pad 14 is wholly formed so as to be substantially flush with the base surface 10.

The touch pad 14 is arranged at a portion of the passenger seat side in an intermediate position in the front and back direction on the operational portion arrangement portion 11. Namely, the touch pad 14 is arranged behind the cup holder 17b of the passenger seat side. Further, at the next to the right of the shift lever 18, the touch pad 14 is arranged in substantial half portion of the passenger seat side in the vehicle width direction at the intermediate portion in the front and back direction of the base surface 10. Here, in the touch pad 14, electrostatic electrode paths are formed over entire lower surface area of the contacted operational surface 14a and these electrostatic electrode paths are connected to an electrostatic capacitance control unit. According to this constitution, electrostatic capacitance is detected, thereby it is detected which contact portion on the contacted operational surface 14a is contacted.

The rest surface formation portion 15 is a portion constituting the raised portion 12 formed behind the operational portion arrangement portion 11 in the operational portion structure 1. Further, the rest surface formation portion 15 is a portion in which the palm rest for the touch pad 14 and the arm rest for the driver seat 3 and the passenger seat 4 are integrally constituted.

That is to say, the rest surface formation portion 15 is formed behind the touch pad 14 and includes a palm rest portion 21 for operating the touch pad 14 and an arm rest portion 22 forming a rest surface 15a continuous to the palm rest portion 21. The rest surface 15a is an upper surface of the rest surface formation portion 15 and is formed in a horizontal plane or substantially horizontal plane forming a slightly convex surface. The rest surface formation portion 15 is a coated surface portion with cushion property so as to coat the upper surface of the center console 6.

At the front side, the rest surface formation portion 15 extends the palm rest portion 21 to the position near the rear side of the touch pad 14, and at the rear side, the rest surface formation portion 15 extends the arm rest portion 22 to the position near the rear end portion of the center console 6. In the rest surface formation portion 15, the palm rest portion 21 and the arm rest portion 22 are portions to form the rest surface 15a and have a shape integrally and continuously formed without classification in shape therebetween. In the rest surface 15a, the palm rest portion 21 constitutes a palm rest surface and the arm rest portion 22 constitutes an arm rest surface. Namely, the rest surface formation portion 15 has a constitution in which the palm rest is integrally formed at the front end portion of the portion mainly functioning as the arm rest.

Figure 3:
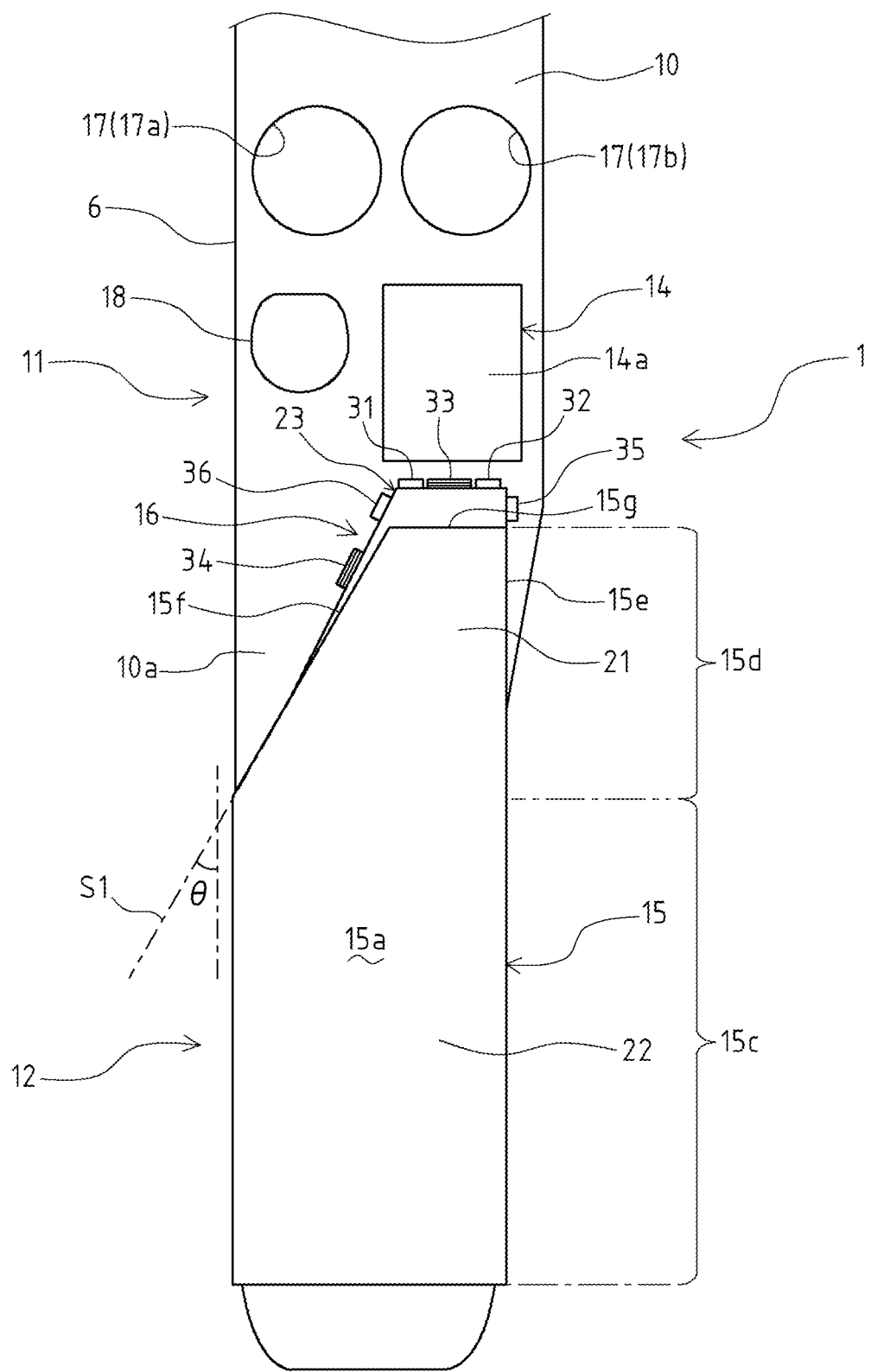
FIG. 3 is a plan view showing the structure for an operational portion in a vehicle according to one embodiment of the present invention.

The form of the rest surface formation portion 15 in a plan view will be described. As shown in FIG. 3, the rest surface formation portion 15 has a constant width portion 15c at a rear portion thereof, the constant width portion 15c having a substantially constant width and a shape along a rectangular shape the front and back direction of which corresponds to the longitudinal direction in a plan view. As a portion continuing to the front side against the constant width portion 15c, the rest surface formation portion 15 has a tapered shape portion 15d forming a shape along a substantially triangle shape having a vertex at the front side as a schematically shape in a plan view. The tapered shape portion 15d and the constant width portion 15c are formed by a proportion of 2:3 according to a dimension in the front and back direction.

As sides forming the shape in a plan view, the tapered shape portion 15d has a side portion 15e at the passenger seat side substantially along the front and back direction and a hypotenuse side portion 15f slanted against the front and back direction and a front side portion 15g substantially along the right and left direction. The side portion 15e at the passenger seat side is a side portion at the anti-driver seat side (passenger seat side) which is substantially parallel with the front and back direction of the vehicle. The hypotenuse side portion 15f at the driver seat side is a side portion at the driver seat side slanted toward the passenger seat side from the driver seat side along the rear side to the front side of the vehicle against the front and back direction of the vehicle. The tapered shape portion 15d has a shape along substantially trapezoid shape in which the front side becomes the upper bottom side in a plan view by the side portion 15e at the passenger seat side, the hypotenuse side portion 15f at the driver seat side and the front side portion 15g.

The hypotenuse side portion 15f of the tapered shape portion 15d goes along a straight line S1 making an acute angle θ against the front and back direction in a plan view (see FIG. 3). The angle θ, for example, lies in a range of about 20~40°. In the example shown in Fig., the angle θ is about 30°.

As mentioned above, the rest surface formation portion 15 has the tapered shape formed by the side portions of the side portion 15e at the passenger seat side and the hypotenuse side portion 15f at the driver seat side, as the front shape in a plan view. Further, in the rest surface formation portion 15, the tapered shape portion 15d having a tapered shape in a plan view mainly functions as the palm rest portion 21 and the constant width portion 15c behind the tapered shape portion 15d mainly functions as the arm rest portion 22.

The rest surface formation portion 15 with the form mentioned in the above in a plan view is provided in a state that substantial whole of the tapered shape portion 15d is overlapped with the rear portion of the operational portion arrangement portion 11. Namely, in a plan view, the rest surface formation portion 15 is provided in a state that substantial whole of the tapered shape portion 15d digs into the rear side of the operational portion arrangement portion 11 from the rear side thereof.

Figure 4:
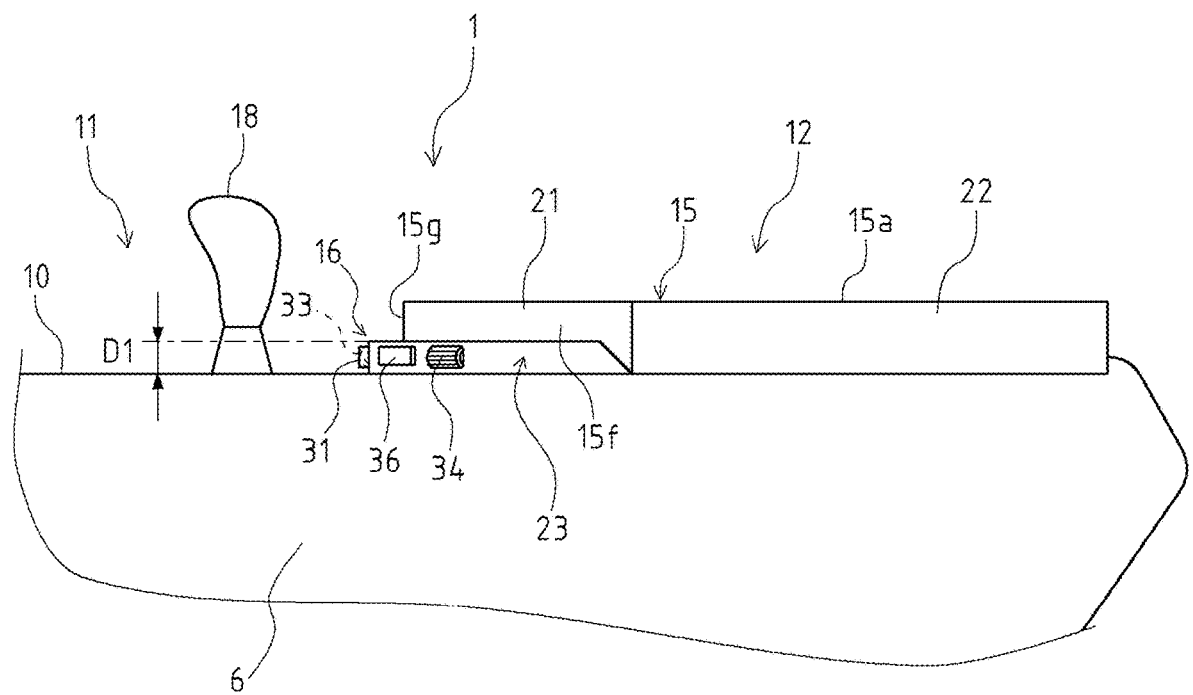
FIG. 4 is a left side view showing the structure for an operational portion in a vehicle according to one embodiment of the present invention.

A portion of the rest surface formation portion 15 overlapping with the operational portion arrangement portion 11 is parallel formed with a distance therebetween over the base surface 10. Namely, as shown in FIG. 4, the tapered shape portion 15d of the rest surface formation portion 15 extends forward so as to separate upward with a predetermined distance D1 against the base surface 10.

Further, in the rear portion of the operational portion arrangement portion 11 with which the tapered shape portion 15d of the rest surface formation portion 15 is overlapped, there exists a room portion 10a of the base surface 10 at the driver seat side of the tapered shape portion 15d. The room portion 10a is a portion exposed without being covered with the rest surface formation portion 15 based on the tapered shape of the tapered shape portion 15d occurring by the hypotenuse side portion 15f at the driver seat side on the base surface 10. In the room portion 10a, for example, there are formed output-input terminals and the like connected to outer connected equipment for the in-vehicle equipment.

The audio switch 16 is an operational portion to operate the audio device loaded in the vehicle. The audio switch 16 is formed between the touch pad 14 and the arm rest portion 22 of the rest surface formation portion 15 in the front and back direction.

The audio switch 16 has a casing 23 (also referred to as an "audio switch housing") with an outline shape of plank having a shape in a plan view (plate plane shape) along a substantially triangle shape, similar to the tapered shape portion 15d. The audio switch 16 is provided so as to be sandwiched between the base surface 10 and the palm rest portion 21 of the rest surface formation portion 15 (tapered shape portion 15d) with the predetermined distance D1 therebetween as mentioned above while making the plate plane of the casing 23 as the horizontal direction. Namely, the audio switch 16 is interposed between the base surface 10 and the palm rest portion 21 of the rest surface formation portion 15 and is provided on the base surface 10 so as to constitute a lower layer portion against the palm rest portion 21 constituting a surface layer portion.

The audio switch 16 is provided so that the casing 23 thereof is fixed on the base surface 10. Further, the audio switch 16 is provided so that the palm rest portion 21 of the rest surface formation portion 15 is put and fixed on the casing 23. The audio switch 16 is provided so that a large part of the casing 23 is overlapped with the palm rest portion 21 of the rest surface formation portion 15. As mentioned, the audio switch 16 is provided so as to integrally form a layered structure in cooperation with the palm rest portion 21.

The audio switch 16 is provided so that the shape in a plan view with a substantially triangle shape of the casing 23 corresponds to a shape in a plan view with a substantially triangle shape of the tapered shape portion 15d of the rest surface formation portion 15. Further, the audio switch 16 is provided so that the front end portion of the casing 23 is protruded forward than the front end portion of the tapered shape portion 15d. that is, the front end portion of the palm rest portion 21. Therefore, on the base surface 10, it is constituted a stepwise portion with 2 steps based on the front end portion of the audio switch 16 and the front end portion of the palm rest portion 21.

Figure 5:
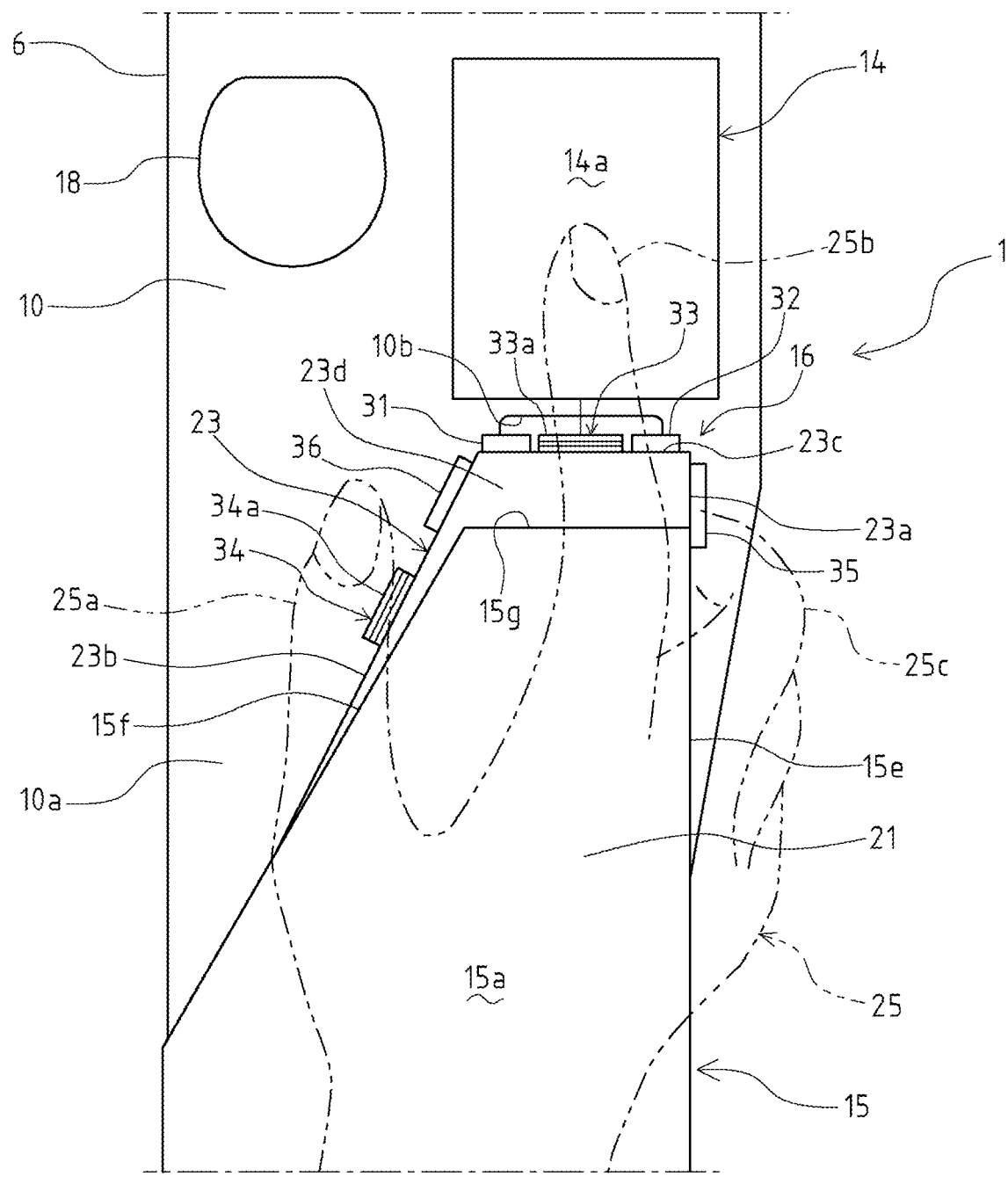
FIG. 5 is an enlarged plan view showing the structure for an operational portion in a vehicle according to one embodiment of the present invention.

As shown in FIG. 5, the casing 23 of the audio switch 16 has a side surface 23a at the passenger seat side substantially along the front and back direction, a side surface 23b at the driver seat side slanted against the front and back direction and a side surface 23c of the front side substantially along the right and left direction, as the side surfaces constituting the shape in a plan view. The side surface 23c may also be referred to as a frontal edge of the casing 23 of the audio switch 16. In a plan view, a rear portion of side surface 23a at the passenger seat side is overlapped with the side portion 15e at the passenger seat side and a rear portion of the side surface 23b at the driver seat side is overlapped with the hypotenuse side portion 15f at the driver seat side. Further, the front side surface 23c positions more forward than the front side portion 15g. The front side portion 15g may also be referred to as a frontal edge of the rest surface formation portion 15. Namely, the front side surface 23c positions between the touch pad 14 and the palm rest portion 21 in the front and back direction of the vehicle. As mentioned, the casing 23 has a shape substantially along a trapezoid shape in which the front side becomes the upper bottom side in a plan view, based on the side surface 23a at the passenger seat side, the side surface 23b at the driver seat side and the front side surface 23c, similarly to the tapered shape portion 15d.

The audio switch 16 has various switch operational portions on the side surface of the casing 23. The audio switch 16 has a front operational portion provided on the front side surface 23c and a side operational portion provided on the side surface 23b at the driver seat side positioning at the driver seat side against the palm rest portion 21.

In the present embodiment, the audio switch 16 has three operational portions consecutively provided in the lateral direction as the front operational portion arranged on the front side surface 23c. These three operational portions are, as shown in FIG. 5, push buttons 31 and 32 provided at the right and left both sides at the front end portion of the audio switch 16 and a wheel button 33 arranged between the right and left push buttons 31, 32. Further, the audio switch 16 has a sam wheel 34 as the side operational portion provided on the side surface 23b at the driver seat side. Further, at the front end portion of the side surface 23a at the passenger seat side, a push button 35 is provided and a push button 36 is arranged at the front end portion of the side surface 23b at the driver seat side.

The push buttons 31, 32 are push operational portions each of which receives press operation. On the front side surface 23c, the push button 31 is provided at the driver seat side of the wheel button 33 and the push button 32 is provided at the passenger seat side of the wheel button 33.

The wheel button 33 is arranged at the center in the longitudinal direction (substantially right and left direction) of the front side surface 23c. The wheel button 33 is a cylindrical rotational operation portion in which a rotational axis direction corresponds to a direction along the front side surface 23c in a plan view. The wheel button 33 has a cylindrical operational portion body 33a which is rotatably supported in the casing 23 so that a central axis becomes a rotational axis direction. The operational portion body 33a is supported in a state that an approximate half portion in a radial direction is protruded from the front side surface 23c, that is, in a state that the operational portion body 33a is protruded in an approximate semicylindrical state from the front side surface 23c. On an outer peripheral surface of the operational portion body 33a, a plurality of grooves along the rotational axis direction of the operational portion body 33a are formed in a peripheral direction.

As mentioned in the above, among three operational portions possessed on the front side surface 23c by the audio switch 16, the wheel button 33 corresponding to the operational portion positioned at the center is a different kind of operational portion in which outline shape and input operation are different against the push buttons 31, 32 corresponding to the right and left operational portions. The push buttons 31, 32 are the operational portions which receive press operation as input operation and the wheel button 33 is the operational portion which receives rotational operation as input operation. Here, the wheel button 33 may be an operational portion which receives press operation in addition to rotational operation as input operation. That is, it may be enough that the wheel button 33 is a different kind of operational portion which has a different shape or receives different input operation against the right and left push buttons 31, 32.

Further, on the side surface 23b at the driver seat side, the sam wheel 34 is provided at a position of more front side than an intermediate portion. The sam wheel 34 is a cylindrical rotational operation portion a rotational axis direction of which is a direction along the side surface 23b at the driver seat side in a plan view. The sam wheel 34 has a cylindrical operation portion body 34a rotatably supported to the casing 23 while a center axis is made as a rotational axis direction. The operational portion body 34a is supported in a state that a substantial half thereof in a radius direction is protruded from the side surface 23b at the driver seat side, that is, the operational portion body 34a is supported so as to protrude from the side surface 23b at the driver seat side in a substantial semicylindrical state. On an outer peripheral surface of the operational portion body 34a, a plurality of grooves along the rotational axis direction of the operational portion body 34a are formed in a peripheral direction.

As mentioned in the above, the sam wheel 34 is an operation portion which receives rotational operation as input operation, similar to the wheel button 33. Here, the sam wheel 34 may be an operational portion which receives press operation in addition to rotational operation as input operation.

The push button 35 arranged on the front end portion of the side surface 23a at the passenger seat side and the push button 36 arranged on the front end portion of the side surface 23b at the driver seat side are push operational portions which receive press operation, similar to the push buttons 31, 32. The push button 36 positions in front of the sam wheel 34.

As mentioned in the above, to each of various operational portions possessed by the audio switch 16, each of various functions concerning the audio device is allotted. As for various functions concerning the audio device, for example, volume adjustment function of playback sound, playback■stop function of playback sound, seek track function, tuner tuning function, exchange function of various media such as CD/DVD player or AM/FM tuner and the like.

Furthermore, on a position of the base surface 10 under the front side surface 23c of the casing 23, a recess portion 10b with a long hole shape along the longitudinal direction of the front side surface 23c is formed. The recess portion 10b is, for example, a portion to avoid that nails contact with the base surface 10 when the wheel button 33 or the push button 31, 32 are operated by fingers of a hand in a state that a palm is put on the palm rest portion 21. Therefore, a shape■dimension and depth of the recess portion 10b are designed so as to avoid that nails of fingers operating the wheel button 33 and the like contact with the base surface 10 even if nails of an operator are long to some extent, so that good operability of the wheel button 33 or the push buttons 31, 32 can be obtained.

In the operational portion structure 1 of the present embodiment with constitution described in the above, it is provided the audio switch 16 integrally formed with the palm rest behind the touch pad 14 arranged substantially flush with the base surface 10 and the palm rest portion 21 of the rest surface formation portion 15 is provided in a form of stacked stepwise fashion. Thereby, the operational portion structure 1 has a constitution that the touch pad 14, the audio switch 16 and the rest surface formation portion 15 (palm rest portion 21) are serially arranged in the front and back direction from the front side in order. In this constitution, from the perspective to avoid improper operation of the touch pad 14 and the audio switch 16 and to obtain good operability, dimension of each portion will be set as follows.

Figure 6:
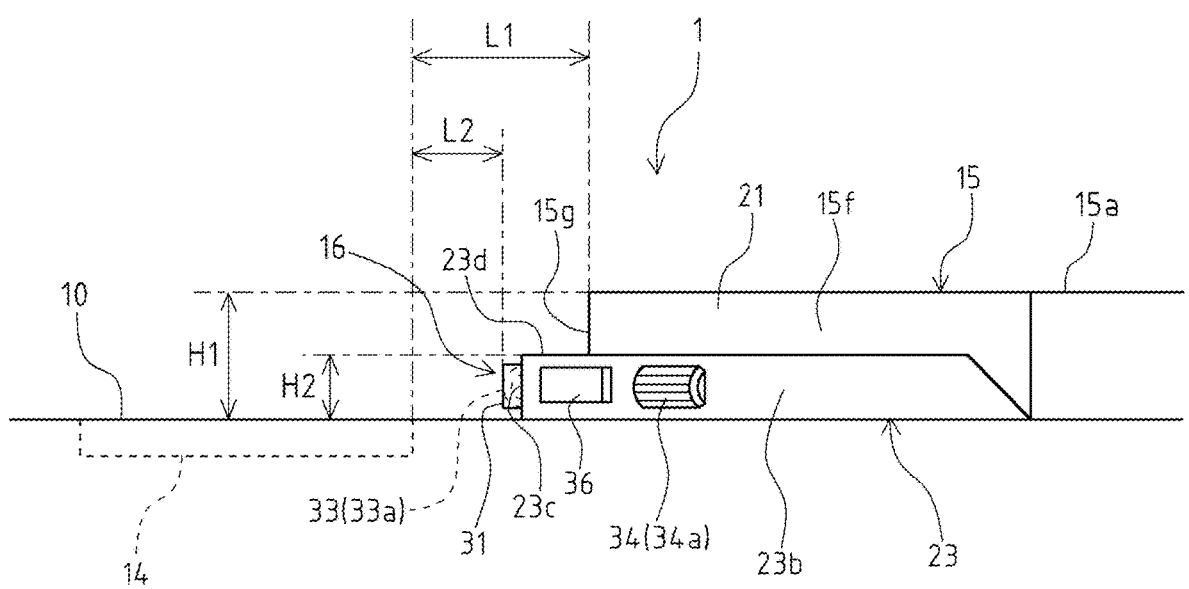
FIG. 6 is an enlarged side view showing the structure for an operational portion in a vehicle according to one embodiment of the present invention.

As a dimension to focus on in the operational portion structure 1 according to the present embodiment, at first as shown in FIG. 6, there is dimension L1 between the rear end position of the touch pad 14 and the front end position of the rest surface formation portion 15 (palm rest portion 21) in the front and back direction (horizontal direction). Similarly, as for the front and back direction, there is dimension L2 between the rear end position of the touch pad 14 and the front end position of the audio switch 16, that is, the front end position of the push buttons 31, 32 or the wheel button 33.

Further, as for dimension to be focused on in the operational portion structure 1, as shown in FIG. 6, there is dimension H1 between the base surface 10 and the upper end position of the front side portion 15g in the rest surface formation portion 15 in the up and down direction (height direction). Similarly, as for the up and down direction, there is dimension H2 between the base surface 10 and the position of the upper surface 23d of the casing 23 in the audio switch 16. Here, in FIG. 6, illustration of the shift lever 18 is omitted.

Concerning the dimension of each of the portions, at first, when the dimension L1 in the front and back direction between the touch pad 14 and the rest surface formation portion 15 is large, it is difficult to secure the function as the palm rest portion 21 of the rest surface formation portion 15. On the other hand, when the dimension L1 is small, it will be fear that operability of the front operational portion of the wheel button 33 and the like provided to the front end portion of the audio switch 16 will be reduced due to the front and back relation between the touch pad 14 and the audio switch 16.

Further, when the dimension L2 between the touch pad 14 and the audio switch 16 in the front and back direction is large, the audio switch 16, which is desired to be arranged to the near position to the touch pad 14 as the operational portion of multi-media system, becomes distant from the touch pad 14. On the other hand, when the dimension L2 is small, it will occur as cause inviting improper operation a situation that the finger to operate any one of the touch pad 14 and the audio switch 16 interferes with any other operational portion. Therefore, it will become difficult to obtain mutually independent good operability of the touch pad 14 and the audio switch 16.

Further, when the dimension H1 between the base surface 10 and the palm rest portion 21 in the up and down direction is large, the distance to the front operational portion of the contacted operational surface 14a of the touch pad 14 and the wheel button 33 of the audio switch 16 and the like from the rest surface 15a becomes long. Thus, good operability for each of the operational portions cannot be obtained. On the other hand, when the dimension H1 is small, it will become difficult to obtain cushion property as the palm rest portion 21 for the rest surface formation portion 15 and it will become difficult to secure space to operate the wheel button 33 and the like for the audio switch 16.

When the dimension H2 between the base surface 10 and the audio switch 16 in the up and down direction is large, based on necessity to secure thickness of the palm rest portion 21, similar to the dimension H1, the distance to the contacted surface 14a and the wheel button 33 and the like from the rest surface 15a becomes long. Thus, good operability for each of the operational portions cannot be obtained. On the other hand, when the dimension H2 is small, similar to the dimension H1, it will become difficult to secure space to operate the wheel button 33 and the like.

As mentioned in the above, in the constitution that the touch pad 14, the audio switch 16 and the palm rest portion 21 are serially arranged, based on focusing on the dimension of each portion mentioned in the above, improper operation can be efficiently prevented by giving consideration to improper operation and good operability can be obtained.

Further, the sam wheel 34 which the audio switch 16 possesses on the side surface 23b at the driver seat side is an operational portion to which customizing function in the operational direction is given. For example, as shown in FIG. 5, in the left handle drive car, the sam wheel 34 is operated by the thumb 25b of the right hand 25 of the driver putting on the palm rest portion 21. Furthermore, as for rotational operation of the sam wheel 34 provided in a state that the rotational axis direction becomes along the horizontal direction on the side surface 23b at the driver seat side of the casing 23, rotational operation to the upper side or rotational operation to the lower side is conducted.

Figure 7A:
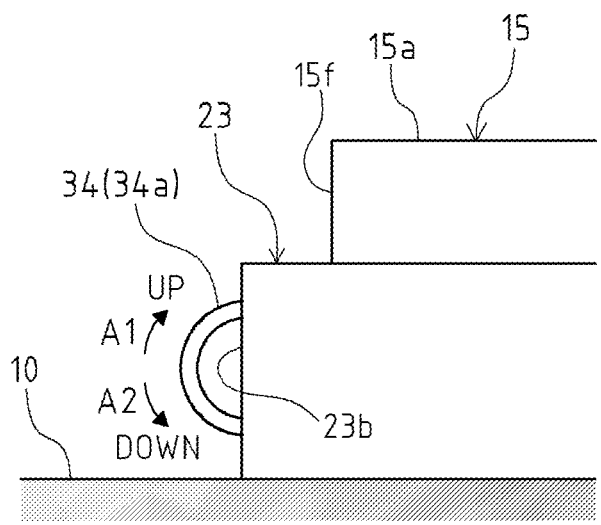
FIGS. 7A and 7B are explanation views explaining for a sam wheel in the structure for an operational portion in a vehicle according to one embodiment of the present invention. Here.

As for each rotational operation direction of the sam wheel 34 of upward direction and downward direction, function corresponding to the rotational operation in each direction can be voluntarily set by a user. Concretely, as shown in FIG. 7A, for example, in the sam wheel 34, a rotational direction A1 to the upper side is utilized as "UP" rotational direction to raise various values such as function to raise volume of the audio device or function to raise frequency of the tuner. In this case, a rotational direction A2 to the lower side is utilized as "DOWN" rotational direction to lower various values such as function to lower volume of the audio device or function to lower frequency of the tuner.

There will be a case that relation between the rotational operation direction of the sam wheel 34 and the function corresponding to each direction gives a sense of incompatibility to a user due to that such relation does not match with sense■image which the user has against the rotational operation portion, because of relation of arrangement position of the sam wheel 34 or rotational axis direction. Thus, the sam wheel 34 is constituted so that function corresponding to the rotational operation direction can be customized.

Figure 7B:
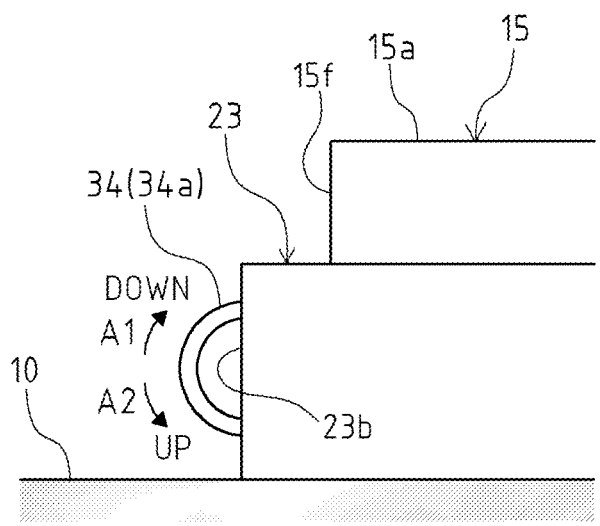

Concretely, as for corresponding relation between the rotational operation direction of the sam wheel 34 and the function corresponding to each direction, it is constituted that the corresponding relation shown in FIG. 7A or the opposite corresponding relation can be selected by the user. In the sam wheel 34 having the latter relation, as shown in FIG. 7B, the rotational direction A1 to the upper side is utilized as the rotational direction of "DOWN" to lower various values such as volume of the audio device and the like and the rotational direction A2 to the lower side is utilized as the rotational direction of "UP" to raise various values such as volume of the audio device and the like. Selection ■exchange of the corresponding relation between the operational direction of the sam wheel 34 and the corresponding function is done, for example, by setting on the display screen of the display 7 or operation of own sam wheel 34 and the like such as long press operation of the sam wheel 34.

As mentioned in the above, according to the constitution that the rotational operation direction of the sam wheel 34 can be customized, the relation between the rotational operation direction of the sam wheel 34 and the function corresponding to each direction can be matched with the operational sense of the different user, for example, corresponding to difference of right handed or left handed of the user and right handle or left handle of the vehicle. Thereby, since incompatibility for sense■image of the user can be removed, operational burden can be reduced and operability for blind operation and the like can be improved. Here, this customizing function of the operational portion can be adopted for the wheel button 33 which is the operational portion of wheel type similar to the sam wheel 34.

Figure 8:
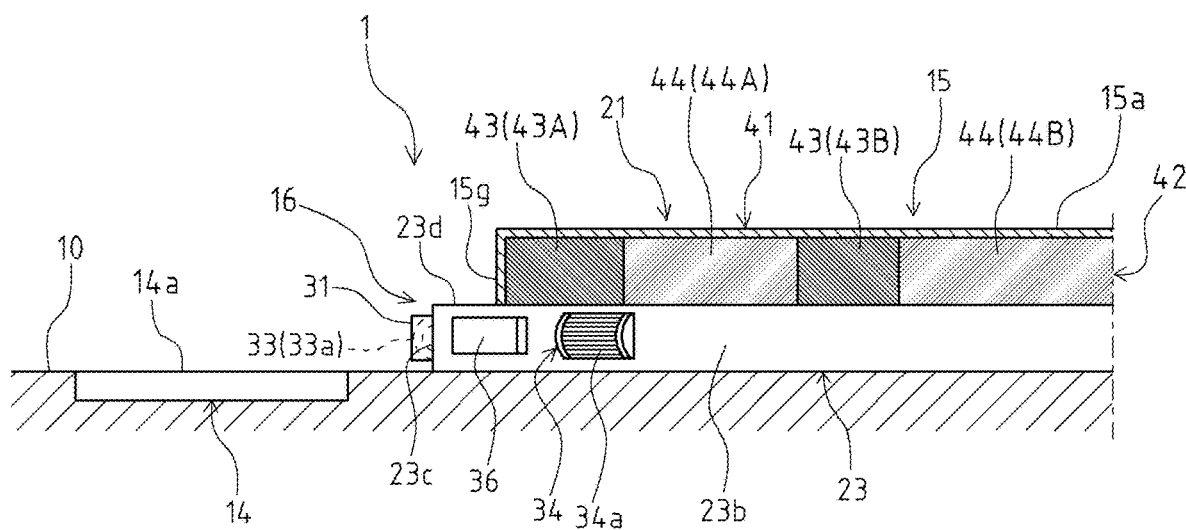
FIG. 8 is a partial sectional side view showing a structure of a palm rest portion in the structure for an operational portion in a vehicle according to one embodiment of the present invention.

Next, a structure of the rest surface formation portion 15 will be described with reference to FIG. 8. As shown in FIG. 8, the rest surface formation portion 15 has a flexible skin portion 41 forming the rest surface 15a and an inner layer portion 42 covered by the skin portion 41 and formed from material with cushion property.

The skin portion 41 is a leather sheet portion formed by artificial material such as synthetic leather having base sheet of artificial leather or natural cloth or natural material such as natural leather. The skin portion 41 is provided so as to cover whole of surface portion in the rest surface formation portion 15 and constitutes surface layer portion of the rest surface formation portion 15. The rest surface 15a is formed by surface of the skin portion 41.

The inner layer portion 42 is a cushion layer formed from material with cushion property, for example, such as urethane foam made of foamed resin material such as polyurethane and the like, sponge, polyethylene fiber or latex. The inner layer portion 42 constitutes inner layer portion of the rest surface formation portion 15 based on that whole of surface portion is covered by the skin portion 41. The inner layer portion 42 deforms following deformation of the skin portion 41.

As mentioned, in the rest surface formation portion 15 having the skin portion 41 and the inner layer portion 42, it is provided as a part of the inner layer portion 42 a rigid portion 43 which is a portion to determine the position of the palm of the operator put on the palm rest portion 21. The rigid portion 43 is a portion which is relatively rigid against the other part of the inner layer portion 42. In the present embodiment, as shown in FIG. 8, it is provided as the rigid portion 43 a front rigid portion 43A to mainly determine the position of the palm suitable for operation of the touch pad 14 and a rear rigid portion 43B to mainly determine the position of the palm suitable for operation of the audio switch 16.

As mentioned, in the constitution having two rigid portions 43 at both the front position and the rear position in the inner layer portion 42 of the palm rest portion 21, there exist the rigid portion 43 and a soft portion 44 with relatively soft property which is the other portion for the rigid portion 43 as portions constituting the inner layer portion 42. That is, in the inner layer portion 42, portions made of relatively rigid material are partially provided at two positions in the palm rest portion 21 as the rigid portion 43. Each rigid portion 43 is provided, for example, in a circle area or an ellipse area in a plan view or in a band form in the right and left direction so as to across the palm rest portion 21.

The front rigid portion 43A is provided in the inner layer portion 42 at the front side of an area which is supposed that the palm of the operator is put on when the touch pad 14 is operated. That is, among the soft portions 44, the soft portion 44A behind the front rigid portion 43A becomes a portion where the palm of hand of operator is put on when the touch pad 14 is operated and becomes a convex portion which is compressed and deformed with deformation of the skin portion 41 by press of the rest surface 15a through hand or due to weight of hand (see FIG. 9A).

Further, the rear rigid portion 43B is provided in the inner layer portion 42 at the front side of an area which is supposed that the palm of the operator is put on when the audio switch 16 is operated. That is, among the soft portions 44, the soft portion 44B behind the front rigid portion 43B becomes a portion where the palm of hand of operator is put on when the audio switch 16 is operated and becomes a convex portion which is compressed and deformed with deformation of the skin portion 41 by press of the rest surface 15a through hand or due to weight of hand (see FIG. 9B).

As for material of the rigid portion 43 and the soft portion 44, for example, rigid urethane foam is adopted as the material of the rigid portion 43 and soft urethane foam or semi-rigid urethane foam is adopted as the material of the soft portion 44. Here, semi-rigid urethane foam is intermediate material of soft urethane foam and the rigid urethane foam. Further, as the other example, rigid sponge is adopted as the material of the rigid portion 43 and soft sponge is adopted as the material of the soft portion 44. Furthermore, as the other example, so-called high rebound cushion material centering on latex is adopted as the material of the rigid portion 43 and so-called low rebound cushion material centering on urethane foam is adopted as the material of the soft portion 44.

Here, in the present embodiment, although two rigid portions 43 of the front rigid portion 43A for operating the touch pad 14 and the rear rigid portion 43B for operating the audio switch 16 are provided, it is not limited to this. For example, in the constitution that the palm position is determined as the common operational position of the touch pad 14 and the audio switch 16, one rigid portion 43 may be adopted.

According to the operational portion structure 1 of the present embodiment as mentioned in the above, in the constitution having the touch pad 14 and the audio switch 16, space efficiency can be improved and operability of each operational portion including blind operability can be improved.

That is, according to the operational portion structure 1 of the present embodiment, in the constitution that the palm rest portion 21 is provided behind the touch pad 14, the audio switch 16 can be arranged near and behind the touch pad 14. Thereby, it can be conducted grouping of the touch pad 14 and the audio switch 16 on the arrangement surface of the center console 6, both the touch pad 14 and the audio switch 16 as operational portions of multi-media system often being mutually related and operated. Further, good operability for these operational portions can be obtained.

Especially, in the operational portion structure 1, the audio switch 16 is provided so that the audio switch 16 becomes a lower layer portion in a case that the palm rest portion 21 which is an integral part with the arm rest portion 22 in the rest surface formation portion 15 becomes an upper layer portion, that is, so that the audio switch 16 forms an integral layer structure with the palm rest portion 21. Thereby, while securing good operability for the touch pad 14 and the audio switch 16, the audio switch 16 can be arranged near the touch pad 14 as much as possible. Therefore, each operational portion in the touch pad 14 and the audio switch 16 can be operated without moving the hand put on the palm rest portion 21 or with only slightly moving thereof and without behavior replacing the hand.

Further, according to the operational portion structure 1, since the palm rest portion 21 can be commonly used as the palm rest of the touch pad 14 and the audio switch 16, hand position of the operator is determined against each operational portion in the touch pad 14 and the audio switch 16 and blind operability of both operational portions can be improved. Thereby, burden of driver of a car can be reduced and high safety can be secured.

Further, since the audio switch 16 and the palm rest portion 21 arranged behind the touch pad 14 are provided under a state that a large part each other is overlapped in the up and down direction, space efficiency can be improved in arrangement space of the operational portions on the center console 6. Thereby, for example, although the width of the center console 6 is comparatively narrow due to relation with the width of the vehicle, the touch pad 14 and the audio switch 16 can be arranged while avoiding interference with the other portion such as cup holder 17 and the shift lever 18 provided on the center console 6 and efficiently utilizing space. Further, since space efficiency can be improved, each operational portion can be easily arranged at a position where the driver can operate each operational portion while retaining elbows at neutral positions, as a result, operability can be improved.

Further, in the operational portion structure 1 of the present embodiment, the touch pad 14 and the audio switch 16 are arranged in the front and back direction at the passenger seat side on the center console 6 including the palm rest portion 21 and also are constituted approximately symmetrical. According to this constitution, since good accessibility against each operational portion can be obtained for an occupant of the passenger seat 4, good operability for each of an occupant of the driver seat 3 and an occupant of the passenger seat 4 can be obtained with good balance.

Furthermore, in the operational portion structure 1 of the present embodiment, the audio switch 16 has the right and left push buttons 31, 32 and the wheel button 33 as the front operational portions provided on the front side surface 23c of the casing 23 positioned between the touch pad 14 and the palm rest portion 21 in the front and back direction, the sam wheel 34 and the push button 36 as the side operational portions provided on the side surface 23b at the driver seat side and also the push button 35 as the operational portion provided on the side surface 23a at the passenger seat side. According to this construction, various operational portions respectively possessed by the touch pad 14 and the audio switch 16 can be efficiently operated while utilizing movement of fingers of hand in the posture that the palm is put on the palm rest portion 21.

Concretely, for example, as shown in FIG. 5, the contacted surface operational surface 14a of the touch pad 14 is operated by an index finger 25b of a right hand 25 put on the palm rest portion 21 and the sam wheel 34 is operated by a thumb 25a, the right and left push buttons 31, 32 are operated by the index finger 25b and a middle finger 25c. Furthermore, the push button 35 is operated by the middle finger 25c and the push button 36 is operated by the thumb 25a. As mentioned, good blind operability can be obtained for various functions of the operational portions of multimedia system.

In the operational portion structure 1 of the present embodiment, the rest surface formation portion 15 has the tapered shape formed by side portions including the side portion 15e at the passenger seat side and the hypotenuse side portion 15f at the driver seat side as the front shape in a plan view. According to this constitution, it can be avoided that the rest surface formation portion 15, which is the raised portion for the base surface 10 on the center console 6, is protruded toward the portion at the driver seat side. A flat space as the base surface 10 can be secured in the driver seat side of the rear upper surface of the center console 6. Thereby, it can be avoided that behavior of arm such as contact of elbow of the right hand with the rest surface formation portion 15 interferes with the rest surface formation portion 15 when the driver sitting on the driver seat 3 operates the operational portion on the center console 6 or operates the steering handle 2. As a result, operability of each operational portion including blind operability can be efficiently improved.

Based on that the top portion of the rest surface formation portion 15 is formed in the tapered shape by the side portion 15e at the passenger seat side and the hypotenuse side portion 15f at the driver seat side, the side surface 23b at the driver seat side of the audio switch 16 can be let along the hypotenuse side portion 15f at the driver seat side and the sam wheel 34 can be arranged on the side surface 23b at the driver seat side. Thereby, since the sam wheel 34 can be provided near the touch pad 14 and at the position distant from the driver seat side on the center console 6, good operability can be obtained in a state that the driver retains natural posture while effectively utilizing space on the center console 6.

Further, in the operational portion structure 1 of the present embodiment, the rest surface formation portion 15 has the skin portion 41 formed from leather sheet and the like and the inner layer portion 42 formed from cushion material covered by the skin portion 41 and the rigid portion 43 which is a relatively rigid portion is provided on a portion constituting the palm rest portion 21 in the inner layer portion 42. By this constitution, based on feeling difference due to difference of hardness in the rest surface formation portion 15, position where the hand of operator is put on the palm rest portion 21 can be guided.

Figure 9A:
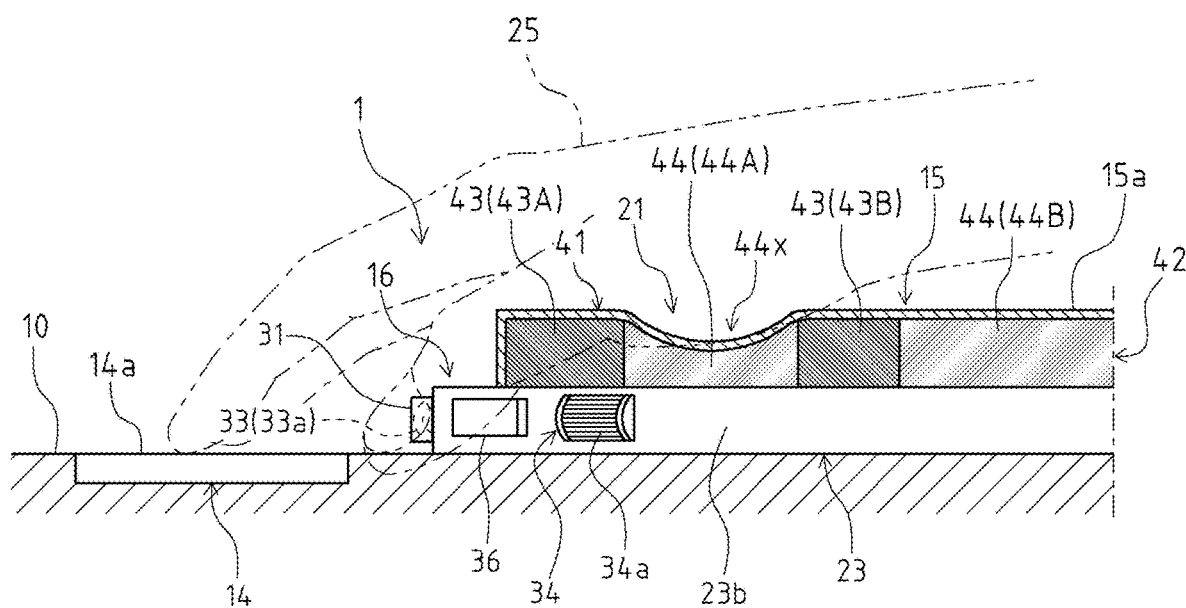
FIG. 9A and FIG. 9B are partial sectional side views showing one example of a using state of the palm rest portion in the structure for an operational portion in a vehicle according to one embodiment of the present invention. Here.

As shown in FIG. 9A, when the touch pad 14 is operated, the front rigid portion 43A is utilized as a portion to position the palm. Concretely, when the palm of the right hand 25 of the operator put on the palm rest portion 21 positions at the rear side of the front rigid portion 43A, a portion of the soft portion 44A at the rear side of the front rigid portion 43A is dented with deformation of the skin portion 41, based on press of the rest surface 15a through hand weight or hand (see dent 44x).

Figure 9B:
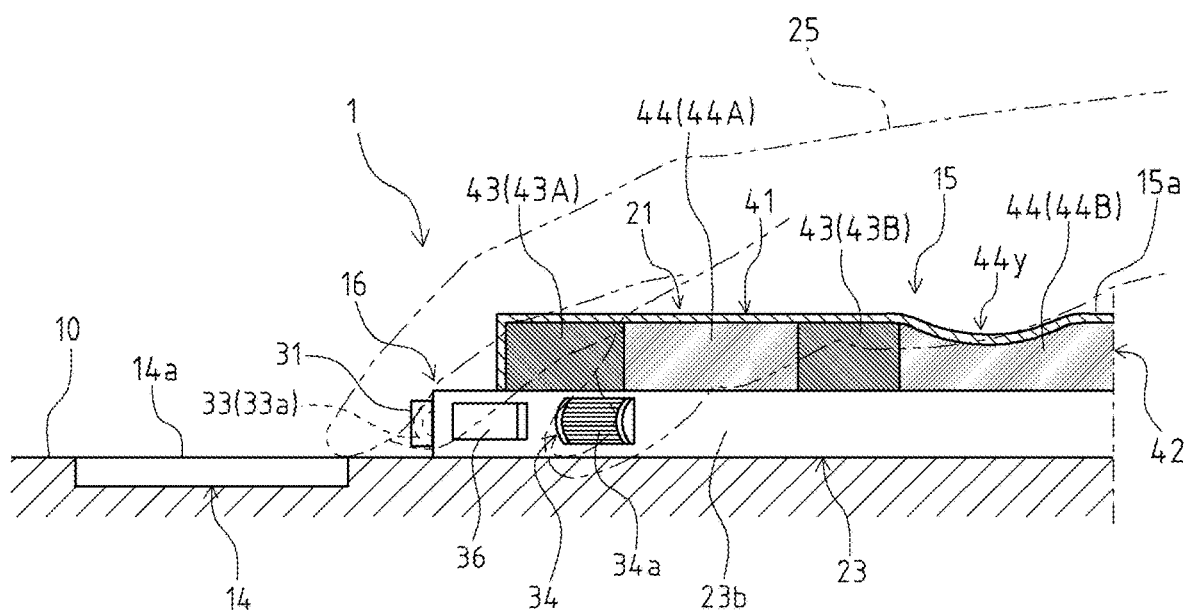

Similarly, as shown in FIG. 9B, when the audio switch 16 is operated, the rear rigid portion 43B is utilized as a portion to position the palm. Concretely, when the palm of the right hand 25 of the operator put on the palm rest portion 21 positions at the rear side of the rear rigid portion 43B, a portion of the soft portion 44B at the rear side of the rear rigid portion 43B is dented with deformation of the skin portion 41, based on press of the rest surface 15a through hand weight or hand (see dent 44y).

Therefore, for example, by moving the hand in the front and back direction on the rest surface 15a while pressing the rest surface 15a by the palm, position of the palm can be positioned to a position near side of the rigid portions (43A, 43B) by hand feeling. That is, based on foreign body feeling of the rigid portion 43 which is relatively rigid against the soft portion 44, position of the palm is respectively determined at the position near side of each rigid portion 43. Thereby, without directly watching hands, since positioning of the palm can be conducted on the rest surface formation portion 15, good blind operability can be obtained.

Further, according to the constitution that the rigid portion 43 is formed in the inner layer portion 42 of the rest surface formation portion 15, a portion to position the palm in the palm rest portion 21 can be provided without affecting appearance of the rest surface formation portion 15. Thereby, blind operability can be improved while providing good design of the rest surface formation portion 15.

Further, in the operational portion structure 1 of the present embodiment, among three operational portions provided on the front end portion of the audio switch 16, the wheel button 33 positioned at the center is different in an outline shape and input operation against the right and left push buttons 31, 32, thus the wheel button 33 is a different kind of operational portion. According to this constitution, three operational portions can be distinguished by hand feeling of the operator without directly watching the operation portions and center position of three operational portions can be grasped. Thereby, blind operability can be improved. Here, in the present embodiment, although the wheel button 33 is a different kind of operational portion against the right and left push buttons 31, 32, it may be enough that the wheel button 33 is different kind of operational portion against at least one of the right and left operational portions.

Hereinafter, a modification of the operational portion structure 1 of the present embodiment will be described. Here, in each of modifications of the operational portion structure 1 of the present embodiment described hereinafter, as for the constitution common with the embodiment described in the above, the same references are used and explanation thereof will be omitted.

(Modification 1)

Modification 1 of the operational portion structure 1 according to the present embodiment will be described with reference to FIGS. 10 to 12. The modification 1 is a modification for the structure of the rest surface formation portion 15.

Figure 10:
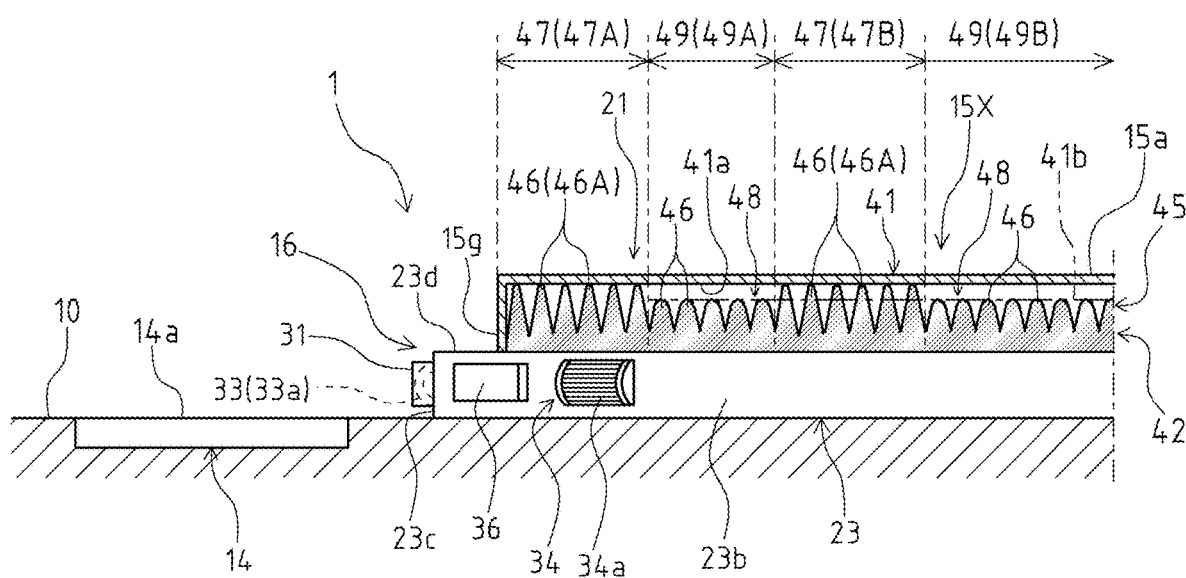
FIG. 10 is a view showing modification 1 of the palm rest portion in the structure for an operational portion in a vehicle according to one embodiment of the present invention.

As shown in FIG. 10, a rest surface formation portion 15X in the modification 1 has the skin portion 41 and the inner layer portion 42, similar to the rest surface formation portion 15 mentioned in the above. Further, in the rest surface formation portion 15X of the modification 1, the inner layer portion 42 has an uneven shape portion 45 in a portion constituting at least the palm rest portion 21.

The uneven shape portion 45 is formed at a side of the skin portion 41 of the inner layer portion 42, that is, at an upper side. Therefore, in the inner layer portion 42, a side of the uneven shape portion 45 becomes a contact side for a back surface 41a of the skin layer 41. The uneven shape portion 45 is formed from many protrusions 46 with mountain shape provided so as to protrude upward. The protrusions 46 are continuously arranged in both the front and back direction and the right and left direction. That is, the uneven shape portion 45 is provided so that unevenness is formed over a whole of the surface side of the inner layer portion 42 in the palm rest portion 21. Here, the uneven shape portion 45 may be formed over a whole of the inner layer portion 42 (also the arm rest portion 22).

As mentioned, the uneven shape portion 45 formed on the inner layer portion 42 includes an uneven portion 47 for guide which is a portion with height of unevenness different from the other portion, as a portion to determine a position of the palm of the operator put on the palm rest portion 21. In the present embodiment, as show in FIG. 10, the uneven portion 47 for guide is formed from protrusions 46A each height of which is higher than the protrusion 46 in the other portion. Further, in the present embodiment, as the uneven portion 47 for guide, a front uneven portion 47A for guide to determine a palm position suitable for mainly operation of the touch pad 14 and a rear uneven portion 47B for guide to determine a palm position suitable for mainly operation of the audio switch 16 are provided.

The protrusion 46 in a portion other than the uneven portion 47 for guide of the uneven shape portion 45 has a height to secure a distance to back surface 41a of the skin portion 41 in the rest surface formation portion 15X in a natural state. On the contrary, the protrusion 46A constituting the uneven portion 47 for guide has a height to contact with the back surface 41a of the skin portion 41 in the rest surface formation portion 15X in a natural state.

As mentioned, in the constitution having the uneven shape portion 45 including the uneven portion 47 for guide in the inner layer portion 42, as the portions constituting the inner layer portion 42, there exist the uneven portion 47 for guide and a normal uneven portion 49 which is a portion relatively deformable by a load from the skin portion 41, the normal uneven portion 49 corresponding to the other portion against the uneven portion 47 for guide of the uneven shape portion 45, That is, in the inner layer portion 42, two portions not relatively deformable against the normal uneven portion 49 are partially formed at two positions in the palm rest portion 21 as the uneven portion 47 for guide. Each uneven portion 47 for guide is, for example, formed in a circle area or an ellipse area in a plan view or formed as a band form in the right and left direction so as to across the palm rest portion 21.

Here, the height of each protrusion 46 in the normal uneven portion 49 is, for example, set to a height to separate by a predetermined dimensional distance against the back surface 41a of the skin portion 41 while vertex of each protrusion 46 becomes along a plane shape of the skin portion 41. In this case, a plurality of protrusions of the normal uneven portion 49 are provided so that each vertex becomes along a virtual surface 41b parallel with the back surface 41a of the skin portion 41. Further, above the normal uneven portion 49, a space 48 layered along the plane shape of the skin portion 41 is formed between the normal uneven portion 49 and the skin portion 41.

The front uneven portion 47A for guide is formed at the front side of a portion supposed that the palm of the hand of the operator is put on when the touch pad 14 is operated. That is, among the normal uneven portions 49, the normal uneven portion 49A behind the front uneven portion 47A for guide becomes a portion where, for example, the palm of the right hand 25 of the operator is put on when the touch pad 14 is operated and becomes a dented portion which is compressed and deformed while accompanying deformation of the skin portion 41 by press of the rest surface 15a through hand weight or hand press (see FIG. 11A).

Further, the rear uneven portion 47B for guide is provided in front of a portion supposed that the palm of the hand of the operator is put on when the audio switch 16 is operated. That is, among the normal uneven portions 49, the normal uneven portion 49B behind the rear uneven portion 47B for guide becomes a portion where, for example, the palm of the right hand 25 of the operator is put on when the audio switch 16 is operated and becomes a dented portion which is compressed and deformed while accompanying deformation of the skin portion 41 by press of the rest surface 15a through hand weight or hand press (see FIG. 11B).

Here, in the present embodiment, although there are provided two uneven portions 47 for guide of the front uneven portion 47A for guide to operate the touch pad 14 and the rear uneven portion 47B for guide to operate the audio switch 16, it is not limited to this. For example, in a constitution that a palm position as operational position is determined commonly with both the touch pad 14 and the audio switch 16, it may be conceivable that the uneven portion 47 for guide is provided at one position.

According to the constitution of the modification 1, based on that feeling difference due to deformability difference of the rest surface formation portion 15X, the putting position of the hand of the operator on the palm rest portion 21 can be guided.

Figure 11A:
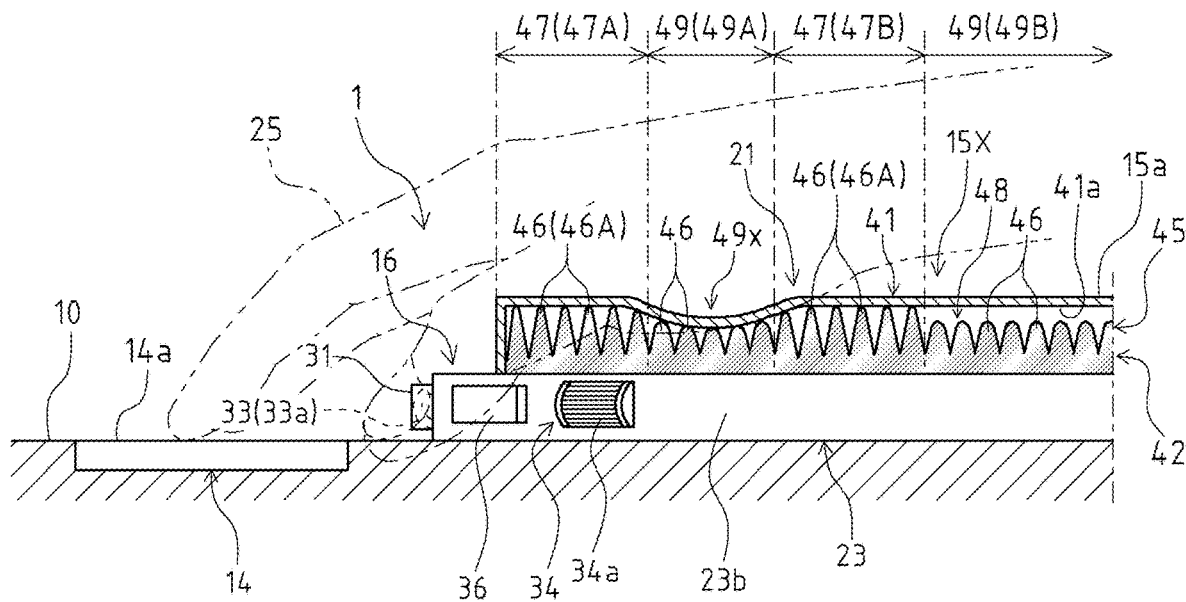
FIG. 11A and FIG. 11B are partial sectional side views showing one example of the using state of the palm rest portion in the structure for an operational portion in a vehicle according to one embodiment of the present invention. Here.

As shown in FIG. 11A, the front uneven portion 47A for guide is utilized as the portion to position the palm when the touch pad 14 is operated. Concretely, when the palm of the right hand of the operator put on the palm rest portion 21 positions to the rear side of the front uneven portion 47A for guide, the normal uneven portion 49A behind the front uneven portion 47A for guide is dented while accompanying deformation of the skin portion 41 by press of the rest surface 15a through hand weight or hand press (dent 49x).

Figure 11B:
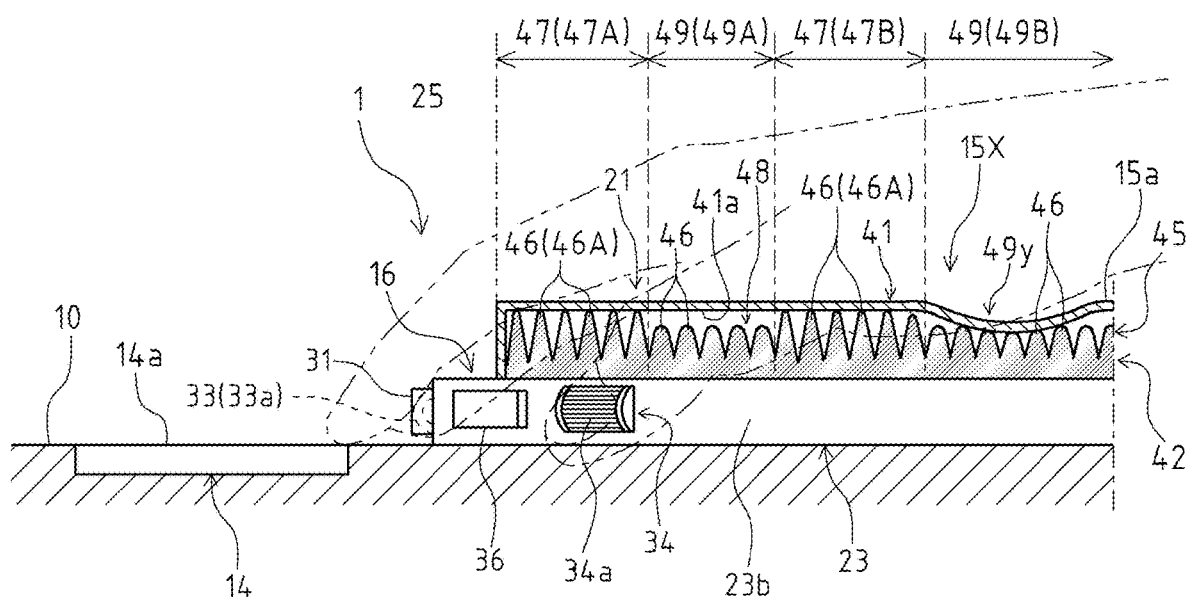

Similarly to the above, as shown in FIG. 11B, the rear uneven portion 47B for guide is utilized as the portion to position the palm when the audio switch 16 is operated. Concretely, when the palm of the right hand of the operator put on the palm rest portion 21 positions to the rear side of the rear uneven portion 47B for guide, the normal uneven portion 49B behind the rear uneven portion 47B for guide is dented while accompanying deformation of the skin portion 41 by press of the rest surface 15a through hand weight or hand press (dent 49y).

Therefore, for example, by moving the hand on the rest surface 15a in the front and back direction while pressing the rest surface 15a to some extent by the palm, the palm can be positioned to the near side of the uneven portion 47 (47A, 47B) for guide by hand feeling. That is, based on foreign body feeling of the uneven portion 47 for guide which is not relatively deformable against the normal uneven portion 49, the palm position is respectively determined at the near side position of each uneven portion 47 for guide. Thereby, since the palm can be positioned on the rest surface formation portion 15X without directly watching the hand, good blind operability can be obtained.

Further, according to the constitution that the uneven shape portion 45 having the uneven portion 47 for guide in the inner layer portion 42 of the rest surface formation portion 15X is provided, the portion to position the palm on the palm rest portion 21 can be provided without affecting the appearance of the rest surface formation portion 15X. Thereby, blind operability can be improved while securing good design of the rest surface formation portion 15X.

Here, in the modification 1 shown in FIG. 10, although the uneven portion 47 for guide of the uneven shape portion 45 is the portion that height of unevenness is made different against the other portions, as the uneven portion 47 for guide, it may be conceivable that at least one of unevenness height and unevenness pitch is different against the other portions.

Figure 12A:
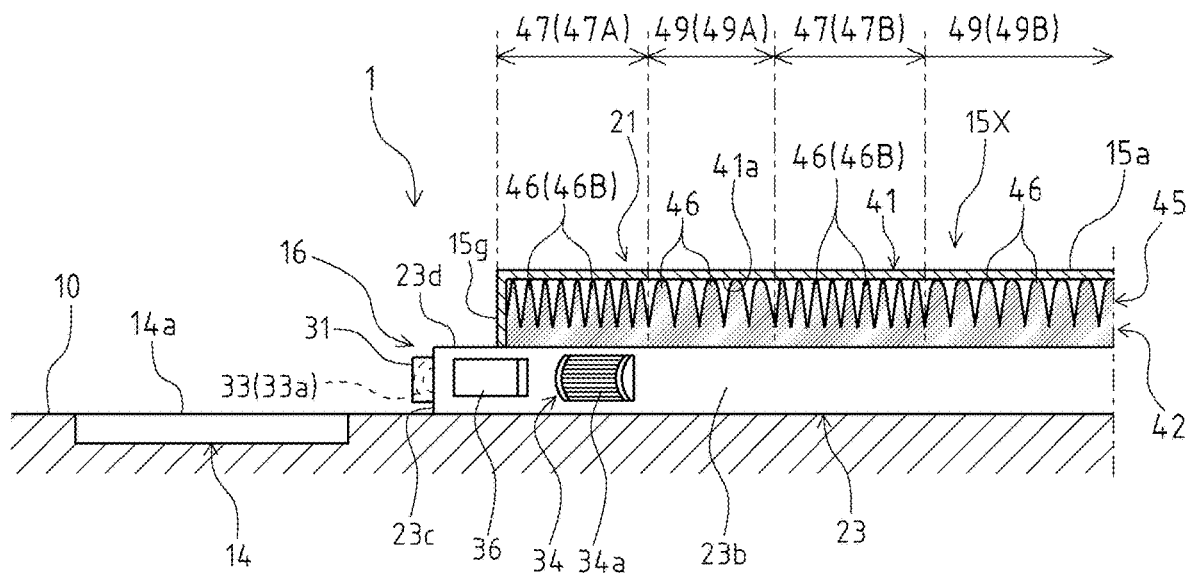
FIG. 12A and FIG. 12B are views showing another structure of the modification 1 of the palm rest portion in the structure for an operational portion in a vehicle according to one embodiment of the present invention. Here.

Therefore, as the uneven portion 47 of the uneven shape portion 45, for example, as shown in FIG. 12A, it may be conceivable that the unevenness pitch is different against the other portions.

In the example shown in FIG. 12A, in a plurality of protrusions 46B constituting the uneven portion 47 for guide, the arrangement pitch in at least any direction of the front and back direction and the right and left direction is provided so as to become smaller against the arrangement pitch in the other part of the uneven shape portion 45. That is, in a case that the normal uneven portion 49, which is the portion other than the uneven portion 47 of the uneven shape portion 45, is supposed to a portion where the protrusions 46 are relatively sparsely formed, the uneven portion 47 for guide becomes a portion where the protrusions 46 are relatively closely formed. Here, in this example, each protrusion 46 of the normal uneven portion 49 has a height so as to contact with the back surface 41a of the skin portion 41 in the rest surface formation portion 15X in a natural state.

Figure 12B:
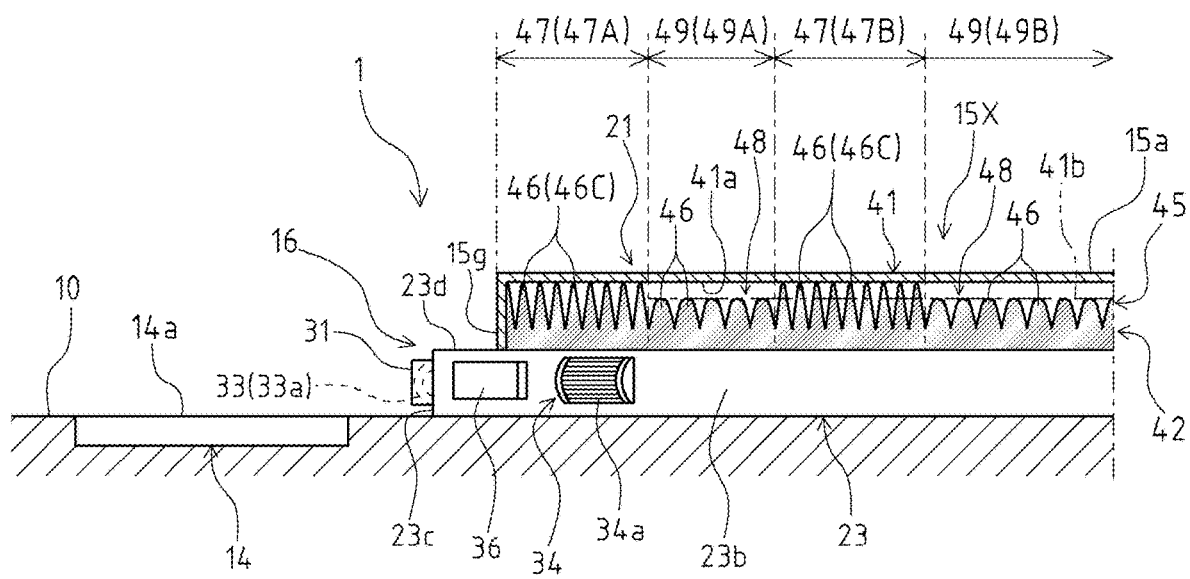

Further, as for the uneven portion 47 for guide of the uneven shape portion 45, for example, as shown in FIG. 12B, it may be conceivable that the uneven portion is a portion where both unevenness height and unevenness pitch are different against the other portions.

In the example shown in FIG. 12B, similar to the protrusions 46B shown in FIG. 12A, in a plurality of protrusions 46C constituting the uneven portion 47 for guide, an arrangement pitch in at least any direction of the front and back direction and the right and left direction is provided so as to become smaller against the arrangement pitch of the protrusions 46 in the normal uneven portion 49 of the uneven shape portion 45.

Further, in the example shown in FIG. 12B, similar to the protrusions 46A shown in FIG. 10, each of a plurality of protrusions 46C constituting the uneven portion 47 for guide has a height to contact with the back surface 41a of the skin portion 41 in the rest surface formation portion 15X in a natural state and each of the protrusions 46 of the normal uneven portion 49 has a height to separate with a distance against the back surface 41a of the skin portion 41 in the rest surface formation portion 15X in a natural state. Therefore, the plural protrusions 46 of the normal uneven portion 49 are provided so as to make along the virtual surface 41b parallel with the back surface 41a of the skin portion 41 and above the normal uneven portion 49, it is provided the space 48 in layered along the plane shape of the skin portion 41.

As mentioned in the above, according to the constitution shown in FIGS. 12A, 12B, the uneven portion 47 for guide becomes the portion which is hard to deform and can guide the position where the hand of the operator is put on the palm rest portion 21. Here, in the constitution of the modification 1, as material for the uneven portion 47 for guide, it may be conceivable that the rigid material relatively rigid against the normal uneven portion 49 is utilized such as the rigid portion 43 shown in FIG. 11A and FIG. 11B. That is, as difference of the portion hard to deform to determine the palm position of the hand of the operator in the palm rest portion 21 against the other portions, difference of material hardness may be utilized in addition to difference in shape of the uneven shape portion 45 having the uneven portion 47 for guide.

(Modification 2)

A modification 2 of the operational portion structure 1 according to the present embodiment will be described with reference to FIG. 13A and FIG. 13B. The modification 2 is a modification concerning the structure of the rest surface formation portion 15.

Figure 13A:
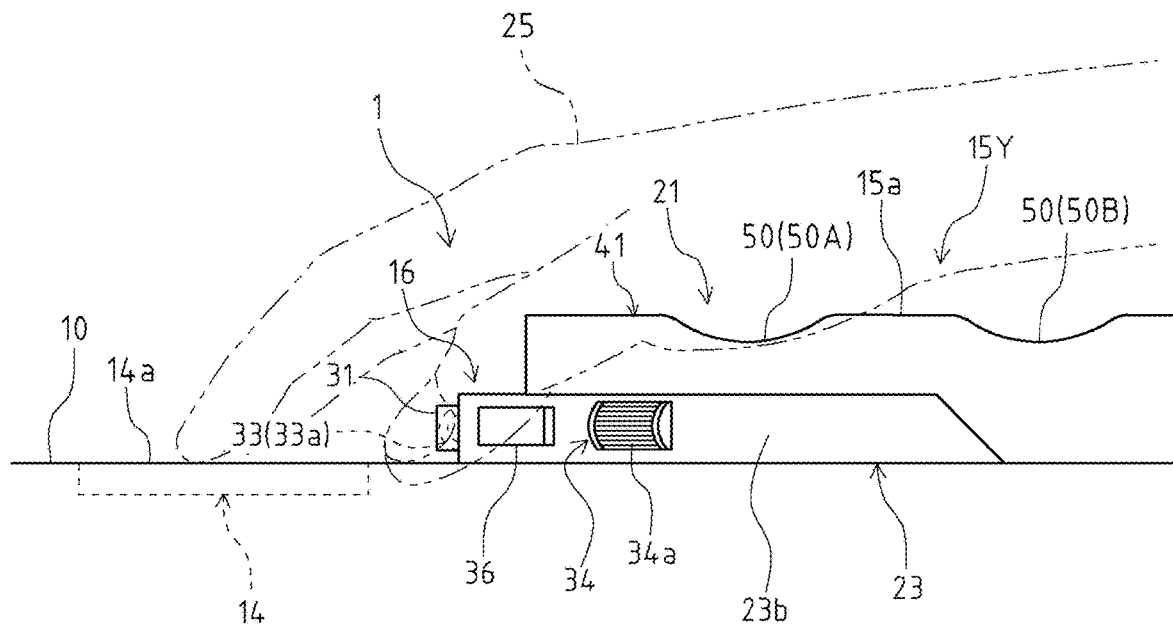
FIG. 13A and FIG. 13B are views showing a modification 2 of the palm rest portion in the structure for an operational portion in a vehicle according to one embodiment of the present invention. Here.
Figure 13B:
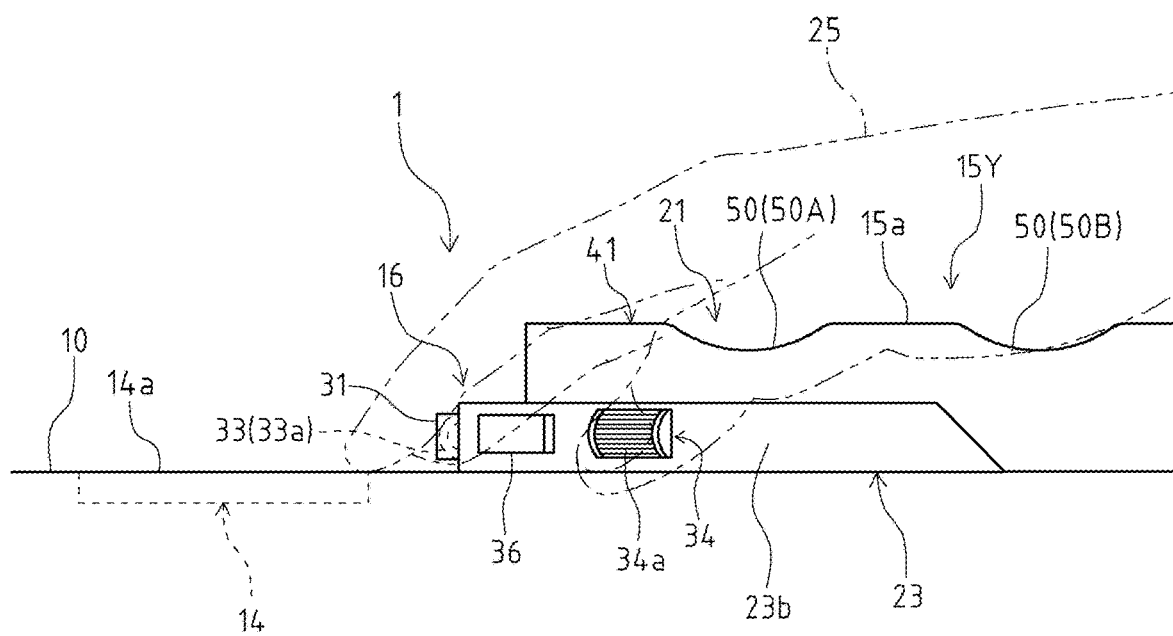

As shown in FIG. 13A and FIG. 13B the rest surface formation portion 15Y of the modification 2 has a recess 50 formed on the upper surface of the palm rest portion 21 as the portion to determine the position of the palm of the operator put on the palm rest portion 21. In the present embodiment, as the recess 50, there are provided a front recess 50A to determine the palm position suitable for mainly operation of the touch pad 14 and a rear recess 50B to determine the palm position suitable for mainly operation of the audio switch 16.

The recess 50 is formed in a shape integral with the skin portion 41 and the inner layer portion 42 in the rest surface formation portion 15Y in a natural state. That is, the recess along the recess 50 in the surface side of the inner layer portion 42 is formed and the recess is formed also in the skin portion 41 so as to follow the shape of the above recess. The recess 50 is, for example, formed in a circle or ellipse area in a plan view in a collapsed state or in a groove form in the right and left direction so as to across the palm rest portion 21.

The front recess 50A is formed at a portion supposed that the hand palm of the operator is put on when the touch pad 14 is operated on the rest surface 15a of the palm rest portion 21. That is, as shown in FIG. 13A, the front recess 50A provided in front of the palm rest portion 21 becomes a portion, for example, where the palm of the right hand of the operator is put on when the touch pad 14 is operated, thus the front recess 50A is utilized for the portion to position the palm of the operator in operation of the touch pad 14.

Further, the rear recess 50B is formed at a portion supposed that the hand palm of the operator is put on when the audio switch 16 is operated on the rest surface 15a of the palm rest portion 21. That is, as shown in FIG. 13B, the rear recess 50B provided in the rear side of the palm rest portion 21 becomes a portion, for example, where the palm of the right hand of the operator is put on when the audio switch 16 is operated, thus the rear recess 50B is utilized for the portion to position the palm of the operator in operation of the audio switch 16.

According to the constitution of the modification 2, based on the shape of the surface portion of the rest surface formation portion 15Y, it can be guided the position where the hand of the operator is put on in the palm rest portion 21. Thereby, since the palm can be positioned on the rest surface formation portion 15Y, good blind operability can be obtained.

Here, in the present embodiment, although the front recess 50A for operation of the touch pad 14 and the rear recess 50B for operation of the audio switch 16 are formed in the palm rest portion 21, it is not limited to this. For example, in a constitution that a palm position as operational position is determined commonly with both the touch pad 14 and the audio switch 16, it may be conceivable that the recess 50 is provided at one position. Further, in the represent embodiment, although the recess 50 is formed as the shape of the skin portion 41 and the inner layer portion 42, for example, it may be conceivable that the recess 50 is formed by embedding a plastic guide member in the skin portion 41.

(Modification 3)

The modification 3 of the operational portion structure 1 according to the present embodiment will be described with reference to FIG. 14A and FIG. 14B. The modification 3 is a modification for the structure of the rest surface formation portion 15 and concerns operation of the audio switch 16.

Figure 14A:
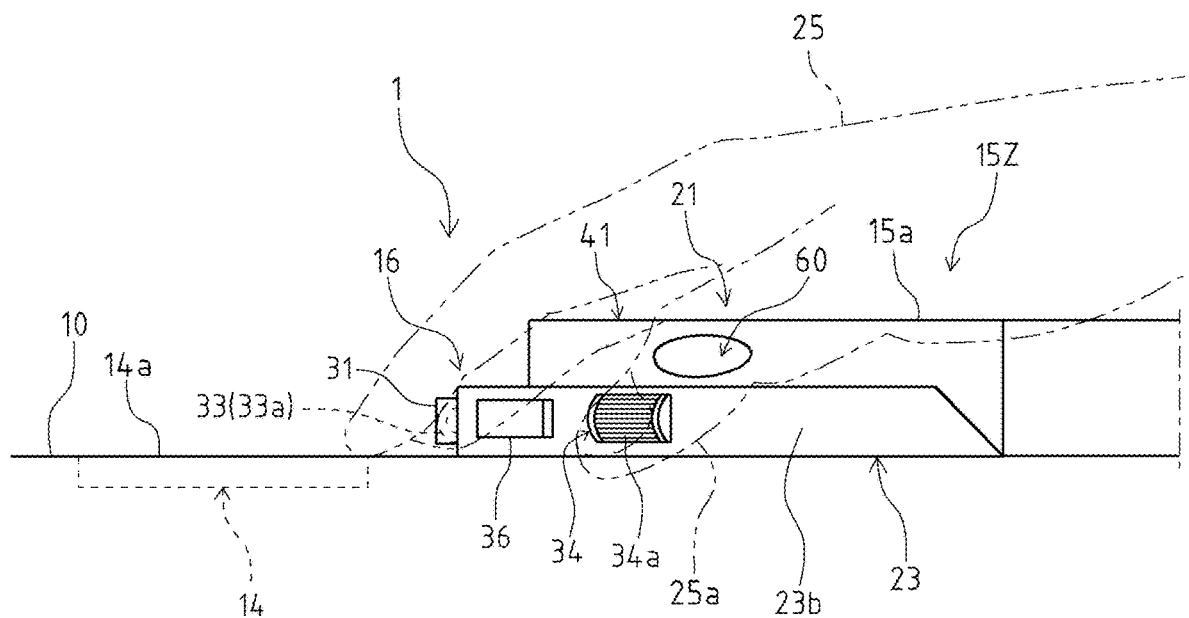
FIG. 14A and FIG. 14B are views showing a modification 3 of the palm rest portion in the structure for an operational portion in a vehicle according to one embodiment of the present invention. Here.
Figure 14B:
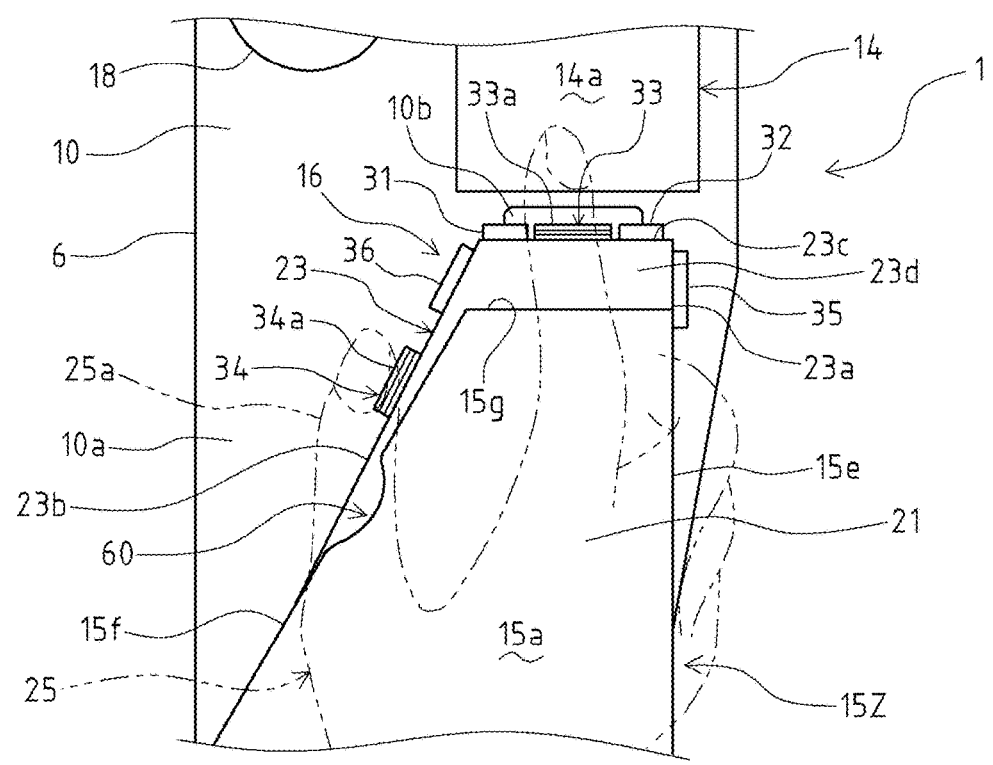

As shown in FIG. 14A and FIG. 14B, in the rest surface formation portion 15Z of the modification 3, it is formed at the side surface of the driver seat side of the palm rest portion 21 a recess for thumb 60 to determine a position of the thumb of the operator operating the sam wheel 34 as a side operation portion.

The recess for thumb 60 is formed in a shape integral with the skin portion 41 and the inner layer portion 42 in the rest surface formation portion 15Z in a natural state. That is, a recess along the recess for thumb 60 is formed at a position of driver seat side of the inner layer portion 42 and a recess is formed also in the skin portion 41 so as to follow the recess shape described in the above. The recess for thumb 60 is, for example, formed in a circle or ellipse area in a collapsed state.

Further, in the hypotenuse side portion 15f which is a side surface portion of the driver seat side of the palm rest portion 21, the recess for thumb 60 is formed at a portion supposed that thumb's belly of the thumb 25a of the hand of the operator fits when the sam wheel 34 of the audio switch 16 is operated, that is, thumb is to be put. Namely, as shown in FIGS. 14A, 14B, the recess for thumb 60 formed at the side portion of the driver seat side of the palm rest portion 21 becomes a portion where the thumb 25a of the right hand 25 of the operator on the palm rest portion 21 fits and is utilized as a portion to position the thumb 25a for operation of the sam wheel 34.

Concretely, the recess for thumb 60 is formed corresponding to posture of the thumb 25a of the right hand under a state that the palm is put on the palm rest portion 21. The sam wheel 34 is an operational portion to be mainly operated by the thumb's belly, thus the recess for thumb 60 is provided at a near position slanted rear upper against the sam wheel 34. That is, the sam wheel 34 is operated by finger portion of the thumb 25a positioning at a finger tip side than finger portion positioning in the recess for thumb 60 in a state that the thumb 25a is positioned in the recess for thumb 60.

The sam wheel 34 is considered to be relatively hard to grasp in blind operation since the sam wheel 34 is provided at a position separate rearward against the operational portions such as the wheel button 33 concentratively arranged to the front end portion of the audio switch 16. Thus, according to the constitution of the modification 3, it can be guided the position where the finger of the operator is put on the palm rest portion 21 based on the shape of the surface portion of the rest surface formation portion 15Z. Thereby, the finger position to operate the sam wheel 34 can be positioned without directly watching hand, therefore it can be easily grasped the position of the sam wheel 34 existing at a position distant rearward against the operational portion positioned at the front end portion of the audio switch 16, as a result, good blind operability can be obtained.

As mentioned in the above, the operational portion structure 1 according to the present invention which is explained by using the embodiment is not limited to the above embodiment and various forms can be adopted within a scope of the present invention. Further, the embodiment including various modifications may be combined and adopted as appropriate.

In the embodiment mentioned in the above, although it is explained a case that the operational portion structure 1 according to the present invention is adopted for the left handle car in which the steering handle 2 is provided at the left side, the operational portion structure 1 can be similarly adopted for the right handle car which has a left-right opposite constitution against the case of the left handle car.

Further, in the embodiment mentioned in the above, although the audio switch 16 possesses the push buttons 31, 32 and the wheel button 33 as the front operational portions and the sam wheel 34 as the side operational portion, it may be enough that the constitution possesses at least any one of the front operational portion and the side operational portion.

The invention claimed is:

1. A control interface for a vehicle provided at a side of a driver seat in the vehicle, comprising:
   a base portion including a touch pad configured to receive user input;
   an audio switch housing that:
      is stacked on top of the base portion and protrudes upward with respect to the base portion;
      includes at least one button or wheel disposed on a side portion thereof,
      is disposed behind the touch pad along a front and back direction of the vehicle;
      is disposed above all portions of the touch pad; and
      is configured to operate an audio device equipped in the vehicle; and
   a rest portion stacked on top of the audio switch housing, the rest portion being disposed behind the touch pad along the front and back direction of the vehicle, the rest portion having, in a plan view, a tapered shape formed by a side portion at a passenger seat side that is parallel with the front and back direction of the vehicle, and a side portion at a driver seat side that is slanted with respect to the front and back direction of the vehicle, such that the rest portion decreases in width closer to a front side of the vehicle,
   wherein a frontal edge of the audio switch housing protrudes farther than a frontal edge of the rest portion along the front and back direction of the vehicle, such that the frontal edge of the audio switch housing is closer to the touch pad and a front of the vehicle than the frontal edge of the rest portion, in the plan view.

2. The control interface according to claim 1, wherein the rest portion includes a flexible skin portion, an inner layer cushion portion, and an inner layer rigid portion that is more rigid than the inner layer cushion portion.

3. The control interface according to claim 1, wherein:
   the rest portion includes a flexible skin portion, and an inner layer, at least a portion of the inner layer being flexible,
   the inner layer includes an uneven shape portion, and
   the uneven shape portion includes a section in which at least one of an evenness height or an evenness pitch is different with respect to other portions of the uneven portion.

4. The control interface according to claim 1, wherein a recess configured to receive a palm of the driver is formed on an upper surface of the rest portion.

5. The control interface according to claim 1, wherein a recess configured to receive a thumb of the driver is provided on a side surface portion at the driver seat side of the rest portion.

6. The control interface according to claim 1, wherein the audio switch housing has two opposing lateral sides that extend straight and are non-parallel with respect to each other in the plan view.

7. The control interface according to claim 1, wherein the audio switch housing includes at least one button or wheel disposed on each of three sides thereof.

8. The control interface according to claim 1, wherein:
- the side portion on which the at least one button or wheel is disposed on the audio switch housing faces the driver seat, and
- a second button or wheel is disposed on a frontal side portion of the audio switch housing that faces toward the front of the vehicle.

9. The control interface according to claim 8, wherein the at least one button or wheel disposed on the side portion that faces the driver seat is a first button, and the second button or wheel disposed on the frontal side portion is a second button.

10. The control interface according to claim 1, wherein the base portion includes a cup holder disposed forward of the touch pad along the front and back direction of the vehicle.

11. The control interface according to claim 1, wherein the base portion includes a shift lever disposed adjacent to the touch pad in a vehicle horizontal direction.

12. The control interface according to claim 1, wherein a top surface of the audio switch housing is devoid of buttons or wheels.

13. The control interface according to claim 1, wherein the rest portion further comprises an arm rest portion disposed behind the tapered shape along the front and back direction of the vehicle, the arm rest portion having a constant width in the plan view along a vehicle horizontal direction.

14. The control interface according to claim 1, wherein the audio switch housing includes the wheel disposed on the side portion thereof, the wheel having a rotational axis that is parallel to a longitudinal direction of the side portion.

* * * * *